(12) United States Patent
Okada

(10) Patent No.: US 7,711,444 B2
(45) Date of Patent: May 4, 2010

(54) AUDIO INPUT/OUTPUT CONTROL APPARATUS AND AUDIO INPUT/OUTPUT CONTROL METHOD

(75) Inventor: Shinya Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 508 days.

(21) Appl. No.: 11/352,884

(22) Filed: Feb. 13, 2006

(65) Prior Publication Data

US 2006/0193601 A1   Aug. 31, 2006

(30) Foreign Application Priority Data

Feb. 15, 2005   (JP)   ............................ P2005-038102

(51) Int. Cl.
G06F 17/00 (2006.01)
G06F 3/00 (2006.01)
G06F 5/00 (2006.01)
G06F 12/00 (2006.01)

(52) U.S. Cl. ............................ 700/94; 710/57; 710/60; 711/110

(58) Field of Classification Search .................. 700/94; 710/52–54, 57–58, 60; 711/110
See application file for complete search history.

(56) References Cited

U.S. PATENT DOCUMENTS 5,850,572 A * 12/1998 Dierke ........................ 711/110
6,304,924 B1 * 10/2001 Varma ........................ 711/110
6,421,636 B1 * 7/2002 Cooper et al. ................ 704/205
6,977,897 B1 * 12/2005 Nelson et al. .................. 710/53
2003/0167170 A1 * 9/2003 Andrsen et al. ............. 704/270
2004/0199732 A1 * 10/2004 Kelley et al. ................. 711/110

FOREIGN PATENT DOCUMENTS

| JP | 61 75396 | 4/1986 |
|---|---|---|
| JP | 8-83096 | 3/1996 |
| JP | 8 202391 | 8/1996 |
| JP | 2000 138591 | 5/2000 |
| JP | 2001-223994 | 8/2001 |
| JP | 2002-232846 | 8/2002 |

* cited by examiner

*Primary Examiner*—Curtis Kuntz
*Assistant Examiner*—Jesse A Elbin
(74) *Attorney, Agent, or Firm*—Frommer Lawrence & Haug LLP; William S. Frommer; Thomas F. Presson

(57) ABSTRACT

An audio input/output control apparatus, in which the speed difference between writing speed in writing audio data to a ring buffer and reading speed in reading out the audio data under a constant speed is calculated. When a read-address is forcibly changed according to the speed difference, between the signal level of the audio data corresponding to a read-address before the change and the signal level of the audio data corresponding to a read-address after the change, an address position at which the signal level change is less than a predetermined value is determined as a read-address after the change. So, the amount of signal processing can be significantly reduced, and the quality of audio data can be maintained.

12 Claims, 20 Drawing Sheets

AUDIO INPUT/OUTPUT CONTROL APPARATUS AND AUDIO INPUT/OUTPUT CONTROL METHOD

CROSS REFERENCE TO RELATED APPLICATIONS

The present invention contains subject matter related to Japanese Patent Application JP 2005-038102 filed in the Japanese Patent Office on Feb. 15, 2005, the entire contents of which being incorporated herein by reference.

BACKGROUND OF THE INVENTION

1. Field of the Invention

The present invention relates to an audio input/output control apparatus and an audio input/output control method that can be desirably employed in video tape recorders for business purposes which are used in, for example, a broadcast station.

2. Description of the Related Art

A video tape recorder for business purposes is configured so as to respond to the demand of producing and broadcasting a program of fifty-five minutes or a program of one hour and five minutes by inserting commercial messages to a recorded ordinary one-hour program.

In this case, as for video, such a video tape recorder is made to perform the variable-speed reproduction processing of producing a fifty-five-minute program or a one-hour-five-minute program from a one-hour program by employing the frame clipping processing or frame interpolation processing within the range of not giving an unnatural impression on a person (for example, refer to Jpn. Pat. Appln. Laid-Open Publication No. 2000-023105).

However, in case of performing the variable-speed reproduction processing, as for audio, the video tape recorder cannot perform the data clipping processing or data interpolation processing since the continuity cannot be maintained. Accordingly, in case of outputting audio in conformity to the variable reproduction speed for video, the tone interval changes, and an unnatural impression is undesirably given on the user.

To cope with this situation, the video tape recorder is provided with a function of so-called program play. The program play is an adjustment function of not changing the tone interval with the continuity of audio maintained when performing the frame clipping processing or frame interpolation processing for video of a program.

SUMMARY OF THE INVENTION

In thus configured video tape recorder, when the program play function is made to operate, vast amounts of signal processing are required so as not to change the tone interval with the continuity of audio maintained. So, it is difficult to maintain the quality of audio data as compared with the case of regular reproduction.

It is therefore desirable to overcome the above-mentioned drawbacks by providing an audio input/output control apparatus and an audio input/output control method that can reduce amounts of signal processing for audio data and maintain the quality of the audio data.

According to one embodiment of the present invention, the speed difference between writing speed in writing audio data sent from outside to a memory and reading speed in reading out the audio data stored in the memory under a constant speed is calculated, and when a read-address is forcibly changed according to the speed difference, between the signal level of the audio data corresponding to a read-address before the change and the signal level of the audio data corresponding to a read-address after the change, an address position at which the signal level change is small is determined as a read-address after the change. Accordingly, since the processing is only forcibly changing a read-address according to the speed difference, the amount of signal processing can be significantly reduced, and the signal level change can be reduced before the read-address change and after the read-address change without changing audio data itself, which can maintain the quality of audio data.

According to one embodiment of the present invention, since the processing is only forcibly changing a read-address according to the speed difference, the amount of signal processing can be significantly reduced, and the signal level change can be reduced before the read-address change and after the read-address change without changing audio data itself, which can maintain the quality of audio data. So, there can be realized an audio input/output control apparatus and an audio input/output control method which reduce the amount of signal processing for audio data and maintain the quality of the audio data.

The nature, principle and utility of the invention will become more apparent from the following detailed description when read in conjunction with the accompanying drawings in which like parts are designate by like reference numerals or characters.

DETAILED DESCRIPTION OF THE PREFERRED EMBODIMENTS

The present invention will further be described below with reference to the accompanying drawings.

(1) Principle of the Present Invention

Firstly, the principle of the audio input/output control apparatus according to one embodiment of the present invention that, when the program play function is made to operate for a program read out from a video tape using a video tape recorder, does not change the tone interval of audio even if the variable-speed reproduction processing employing the frame clipping processing, frame interpolation processing or the like is carried out for video will be explained.

Figure 1:
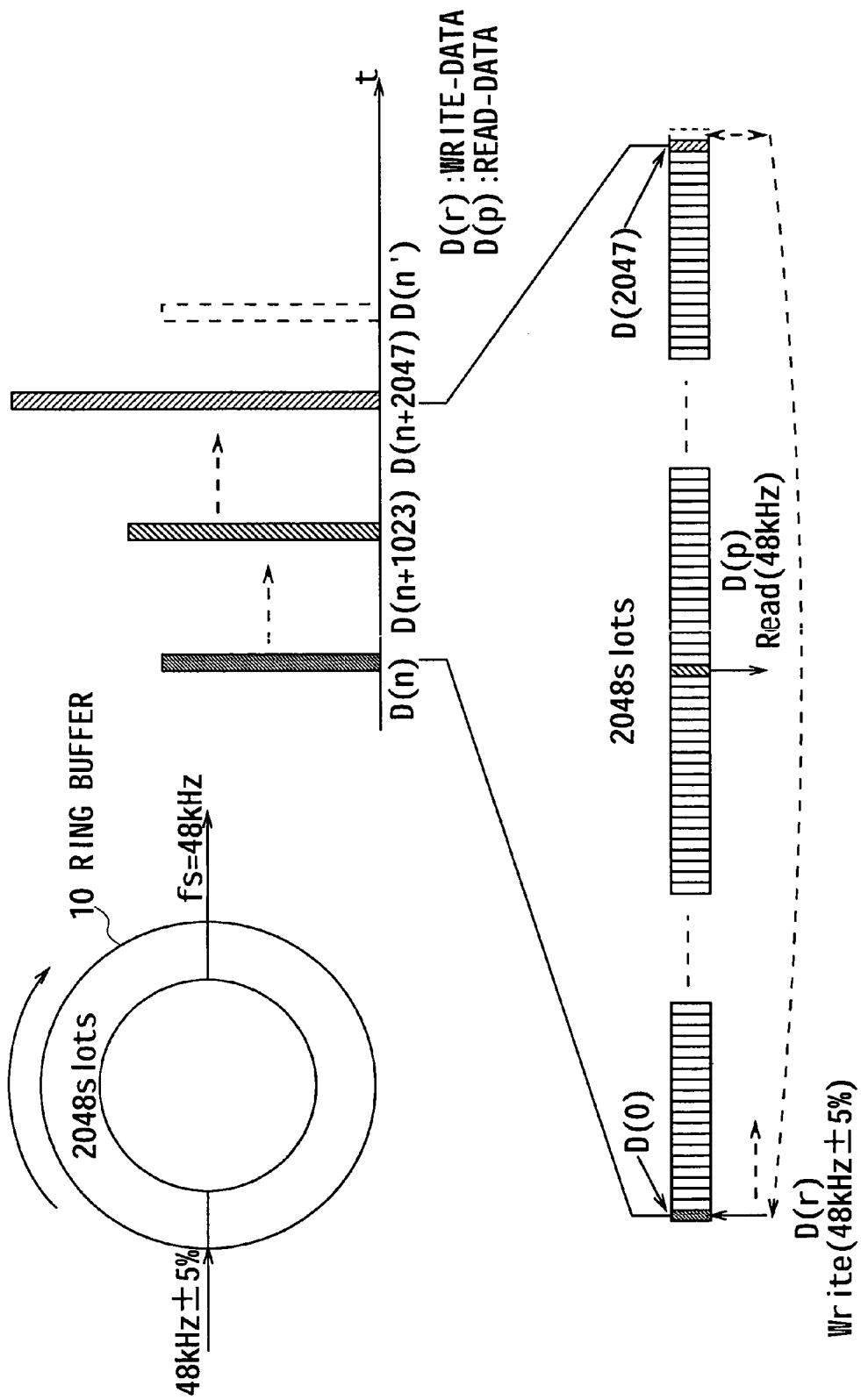
FIG. 1 shows a schematic view indicative of the positional relation of write-data and read-data on a ring buffer.

As shown in FIG. 1, in the audio input/output control apparatus, in case of the standard reproduction processing in which audio data is written to a ring buffer 10 having total 2048 slots under writing speed of 48 kHz, and the audio data is read out from the ring buffer 10 under constant reading speed of 48 kHz, the tone interval of audio output based on the audio data does not change.

On the other hand, in the audio input/output control apparatus, when the program play function of a video tape recorder operates, in conformity to the variable-speed reproduction processing for video, audio data is written to the ring buffer 10 under writing speed of 48 kHz±5%, and the audio data is read out from the ring buffer 10 under constant reading speed of 48 kHz.

In this processing, the audio data is read out under constant reading speed of 48 kHz so as not to change the tone interval of audio to be output based on thus read out audio data.

In reading out audio data, there is raised a stagger between the writing timing and the reading timing due to the fluctuation of ±5% of writing speed for the audio data. Accordingly, read-data will overtake write-data when writing speed is 48 kHz−5%, while write-data will overtake read-data when writing speed is 48 kHz+5%.

Figure 2:
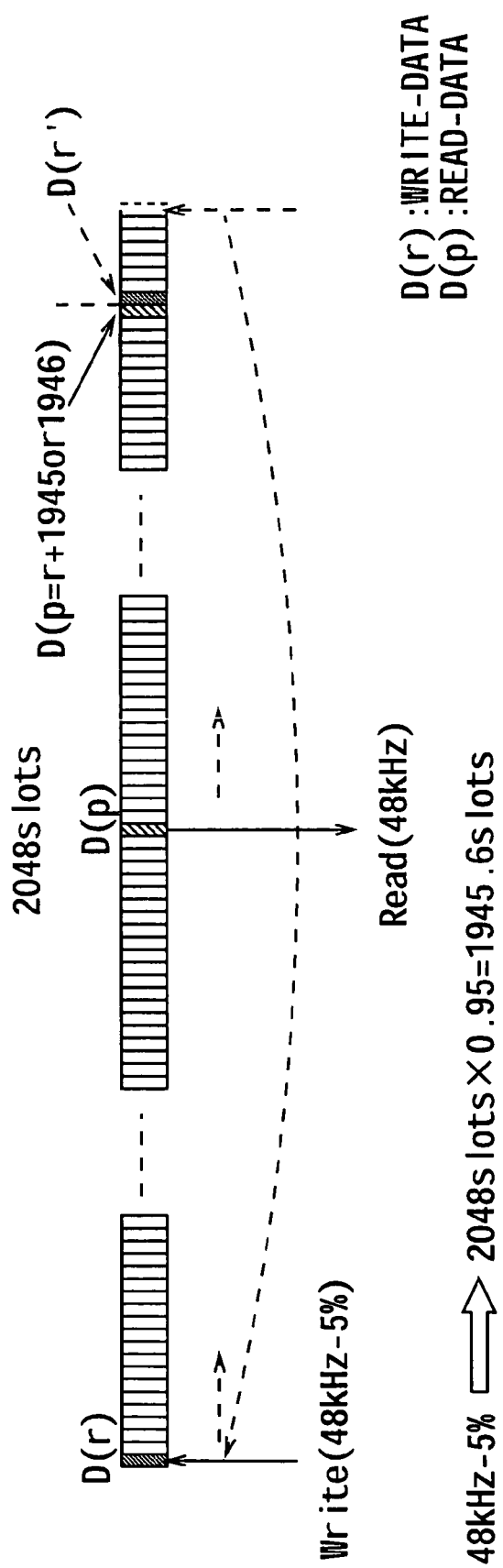
FIG. 2 shows a schematic view indicative of the state in which read-data overtakes write-data.

As shown in FIG. 2, when writing speed for audio data is 48 kHz−5%, since reading speed is constant 48 kHz, reading speed is faster than writing speed. So, when read-data D(p) goes forward by one round (2048 slots), write-data D(r) goes forward by 1945 slots or 1946 slots (2048 slots×0.95=1945.6 slots), and the read-data D(p) catches up and overtakes the write-data D(r) approximately every twenty rounds (2048÷(2048−1945.6)=20).

Figure 3:
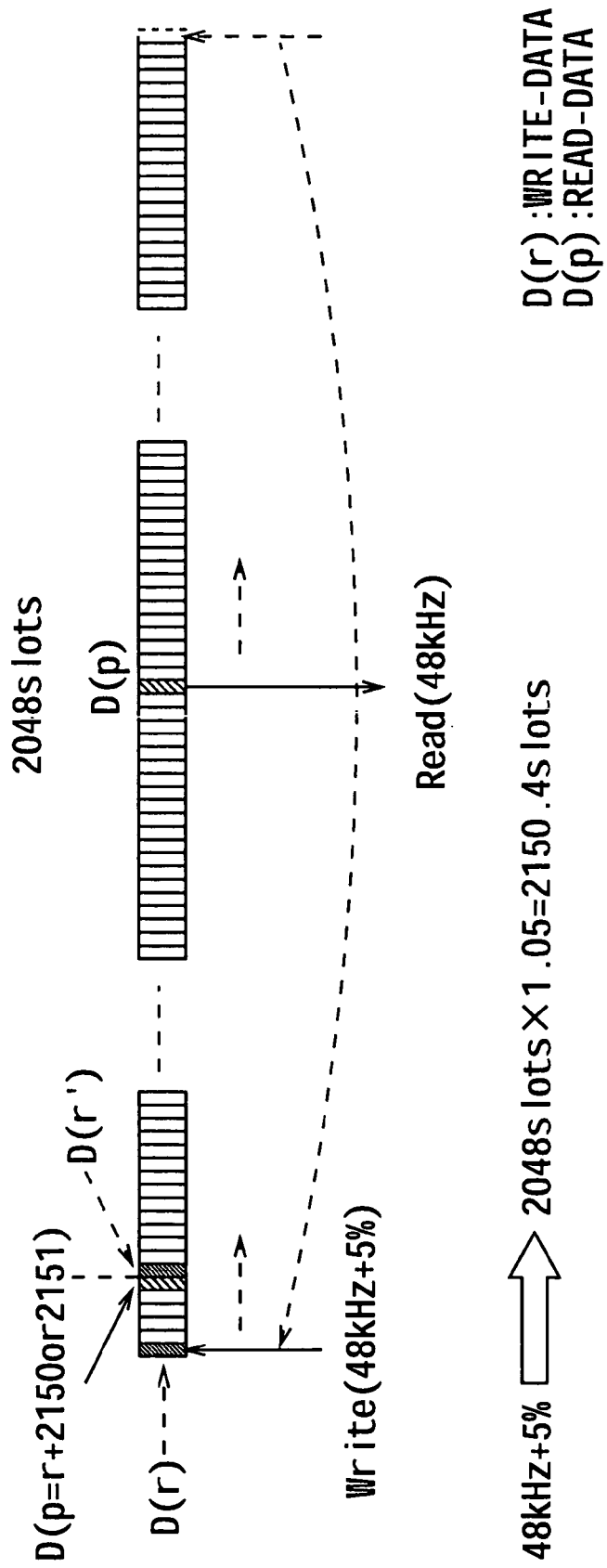
FIG. 3 shows a schematic view indicative of the state in which write-data overtakes read-data.

On the other hand, as shown in FIG. 3, when writing speed for audio data is 48 kHz+5%, since reading speed is constant (48 kHz), writing speed is faster than reading speed. So, when the read-data D(p) goes forward by one round (2048 slots), the write-data D(r) goes forward by 2150 slots or 2151 slots (2048 slots×1.05=2150.4 slots), and the write-data D(r) catches up and overtakes the read-data D(p) approximately every twenty rounds (2048÷(2150.4−2048)=20).

In this way, when the read-data D(p) overtakes the write-data D(r), or when the write-data D(r) overtakes the read-data D(p), the continuity of the read-data D(p) cannot be maintained, thereby raising noise in outputting audio.

Figure 4:
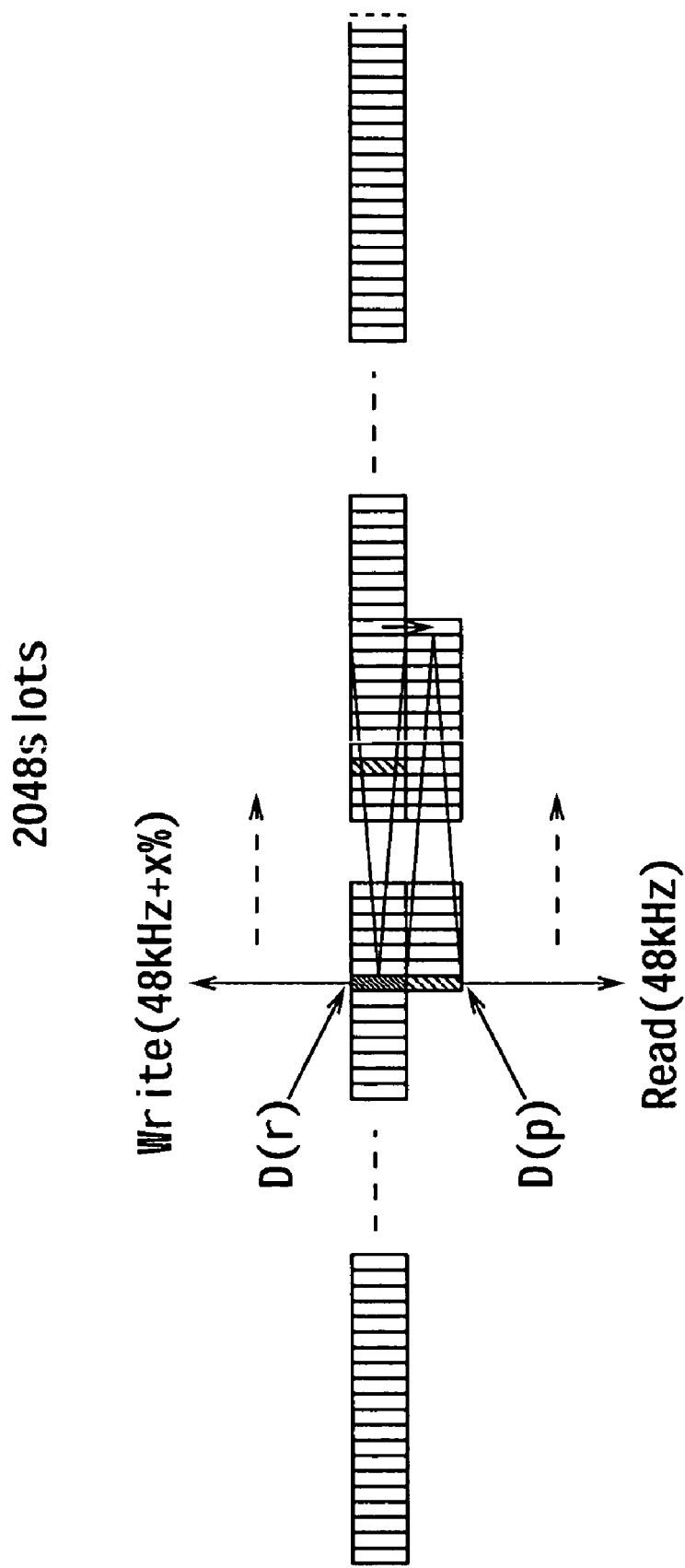
FIG. 4 shows a schematic view for use in explaining the cross-fade processing.

As shown in FIG. 4, in the audio input/output control apparatus, in case the write-data D(r) overtakes the read-data D(p), across-fade buffer for 256 steps or 256 slots is prepared other than the ring buffer 10. Then, so-called cross-fade processing is performed by copying the read-data D(p) before being caught up by the write-data D(r) to the cross-fade buffer by 256 steps, and, when the read-data D(p) is caught up by the write-data D(r), gradually fading out thus copied read-data D(p) and fading in the read-data D(p) right after being written.

Figure 5A:
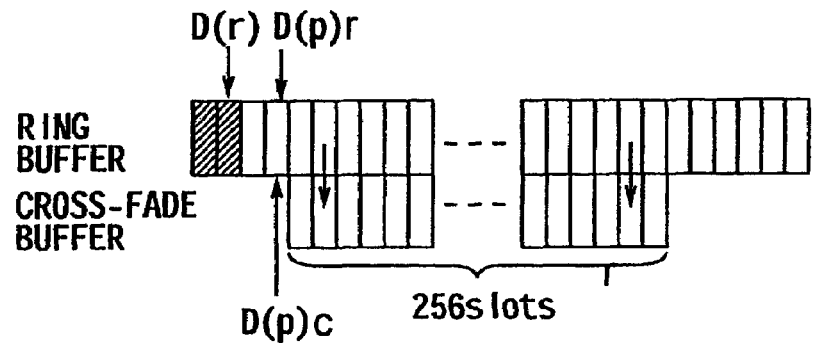
FIGS. 5A to 5D show schematic views for use in explaining the cross-fade processing in which a write-address overtakes a read-address.

That is, referring to FIGS. 5A to 5D, in the cross-fade processing in which a write-address overtakes a read-address, as shown in FIG. 5A, the audio input/output control apparatus copies the read-data D(p)r to the cross-fade buffer by 256 slots right before the read-data D(p)c is caught up by the write-data D(r).

Figure 5B:
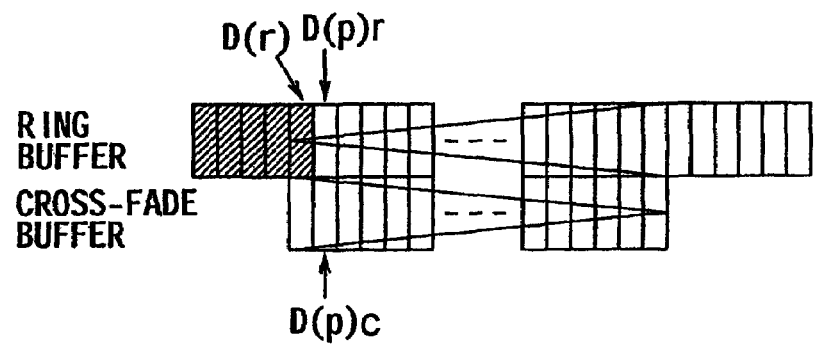

Next, as shown in FIG. 5B, the audio input/output control apparatus gradually fades out the signal level of the read-data D(p)c read out from the cross-fade buffer from the usual level, and gradually fades in the signal level of the read-data D(p)r read out from the ring buffer 10 from zero level.

Figure 5C:
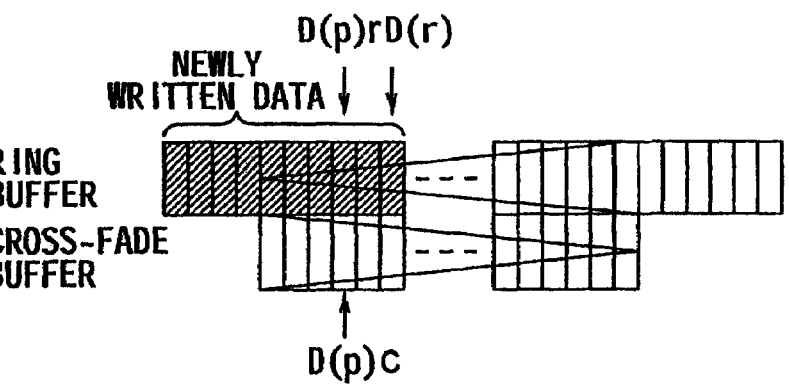

As shown in FIG. 5C, when the write-data D(r) overtakes the read-data D(p)r in the ring buffer 10, after this time point, the audio input/output control apparatus writes the write-data D(r) over the read-data D(p)r of the ring buffer 10 which is not read out yet (shaded area in FIG. 5C).

At this time, even if the read-data D(p)r on the ring buffer 10 comes to be discontinuous at the point of being overtaken, the signal level of the read-data D(p)r read out from the ring buffer 10 is sufficiently small at this time, and concurrently, the signal level of the continuous read-data D(p)c read out from the cross-fade buffer is sufficiently large. So, even if an audio input/output unit reads out the discontinuous read-data D(p)r, the user listening to audio does not feel uncomfortable.

Then, the audio input/output control apparatus keeps on performing cross-fade processing by gradually fading out read-data D(p)c of the cross-fade buffer which is continuous with the read-data D(p)r read out from the ring buffer 10 thus far, and reading out and gradually fading in the write-data D(r) right after being written which is not continuous with the read-data D(p)r read out from the ring buffer 10 thus far as one-round forward read-data D(p)c, and gradually switches read-data from the read-data D(p)c of the cross-fade buffer to the one-round forward read-data D(p)r of the ring buffer 10.

Figure 5D:
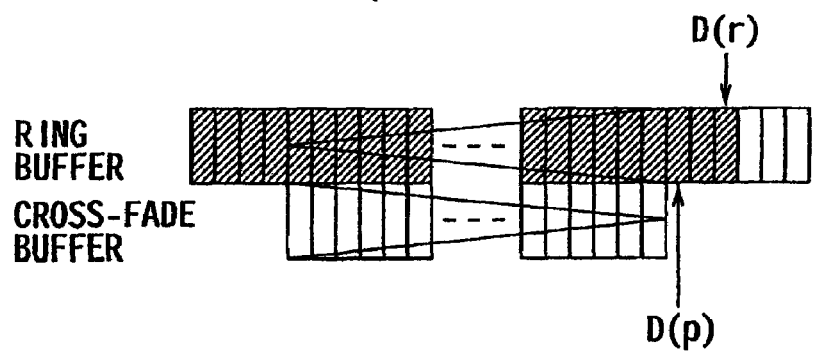

Thereafter, as shown in FIG. 5D, the audio input/output control apparatus completes the cross-fade processing, and reads out write-data D(r) right after being written by the write-data D(r) as the read-data D(p)c under the usual signal level.

In this case, since the audio input/output control apparatus can prevent noise raised when the write-data D(r) overtakes the read-data D(p)c by the cross-fade processing, even if audio data accumulated in the ring buffer 10 is thrown out (data-clipped) by one round, the user feels in auditory sense that the continuity of audio data is maintained.

Figure 6A:
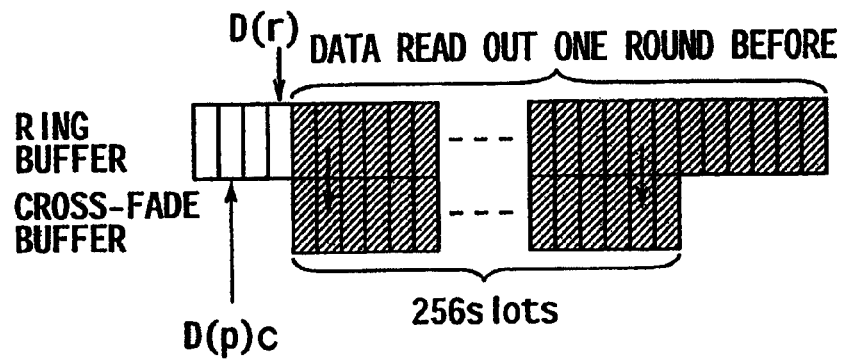
FIGS. 6A to 6D show schematic views for use in explaining the cross-fade processing in which a read-address overtakes a write-address.

Furthermore, referring to FIGS. 6A to 6D, in the cross-fade processing in which a read-address overtakes a write-address, as shown in FIG. 6A, the audio input/output control apparatus copies the read-data D(p)c to the cross-fade buffer by 256 slots right before the write-data D(r) is caught up by the read-data D(p)c.

Figure 6B:
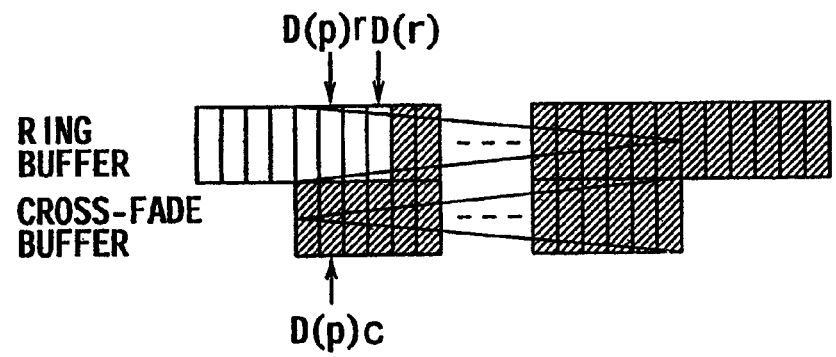

Next, as shown in FIG. 6B, the audio input/output control apparatus gradually fades out the signal level in reading out and outputting the read-data D(p)r right after being written to the ring buffer 10 as the write-data D(r) from the usual level, and gradually fades in the signal level in reading out and outputting the read-data D(p)c (shaded area in FIG. 6B), which is already read out once, from the cross-fade buffer at the second time from zero level.

In this case, since the read-data D(p)c on the cross-fade buffer is of one-round backward, even if the read-data D(p)c is not continuous with the read-data D(p)r read out from the ring buffer 10 thus far, the signal level of the read-data D(p)c read out from the cross-fade buffer is sufficiently small at this time, and the signal level of the read-data D(p)r read out from the ring buffer 10 which is continuous with the read-data D(p)r read out from the ring buffer 10 thus far is sufficiently large. So, even if an audio input/output unit reads out the discontinuous read-data D(p)c, the user listening to audio does not feel uncomfortable.

Then, the audio input/output control apparatus keeps on performing cross-fade processing by gradually fading out read-data D(p)c which is continuous with the read-data D(p)r read out from the ring buffer 10 thus far, and gradually fading in one-round backward read-data D(p)c which is not continuous with the read-data D(p)r read out from the ring buffer 10 thus far, and gradually switches read-data from the read-data D(p)r of the ring buffer 10 to the one-round backward read-data D(p)c of the cross-fade buffer.

Figure 6C:
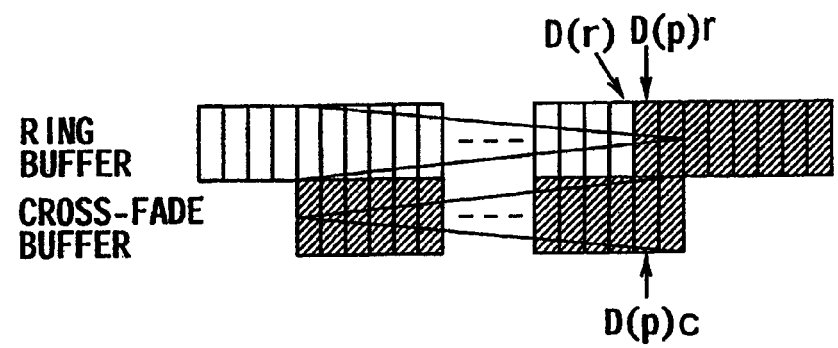

Thereafter, as shown in FIG. 6C, the read-data D(p)r overtakes the write-data D(r) in the ring buffer 10, and after this time point, the audio input/output control apparatus reads out the read-data D(p)r of the ring buffer 10, which is already read out once, at the second time (shaded area in FIG. 6C).

At this time, even if the read-data D(p)r on the ring buffer 10 comes to be discontinuous at the point of being overtaken, the signal level of the read-data D(p)r already read out from the ring buffer 10 is sufficiently small at this time, and concurrently, the signal level of the one-round backward read-data D(p)c read out from the cross-fade buffer is sufficiently large. So, even if an audio input/output unit reads out the discontinuous read-data D(p), the user listening to audio does not feel uncomfortable.

Figure 6D:
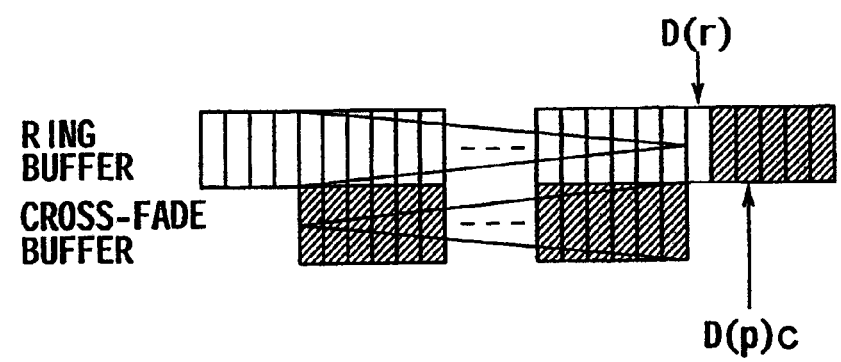

After the cross-fade processing, as shown in FIG. 6D, the audio input/output control apparatus reads out the read-data D(p)c, to be read out at the second time, from the ring buffer 10 under the usual signal level.

In this case, since the audio input/output control apparatus can prevent noise raised when the read-data D(p)c overtakes the write-data D(r) by the cross-fade processing, even if the same audio data accumulated in the ring buffer 10 is re-read out to perform data interpolation, the user feels in auditory sense that the continuity of audio data is maintained.

In this case, since the read-data D(p)c overtakes the write-data D(r), at the time when the cross-fade processing of 256 steps is ended, the write-data D(r) comes to be located right after the read-data D(p)c, and the write-data D(r) will not be overtaken by the read-data D(p)c during a period of time in which the write-data D(r) goes forward by approximately twenty rounds around the ring buffer 10.

In this way, in a video tape recorder, in case the write-data D(r) is overtaken by the read-data D(p)c, or in case the read-data D(p)c is overtaken by the write-data D(r), the cross-fade processing is performed. On the other hand, since signal processing is carried out for audio data using twelve audio tracks, amount of signal processing for the cross-fade processing becomes enormous, which is not effective. Furthermore, in the cross-fade processing, audio data of two kinds are overlapped, which lower the quality of audio.

Figure 7:
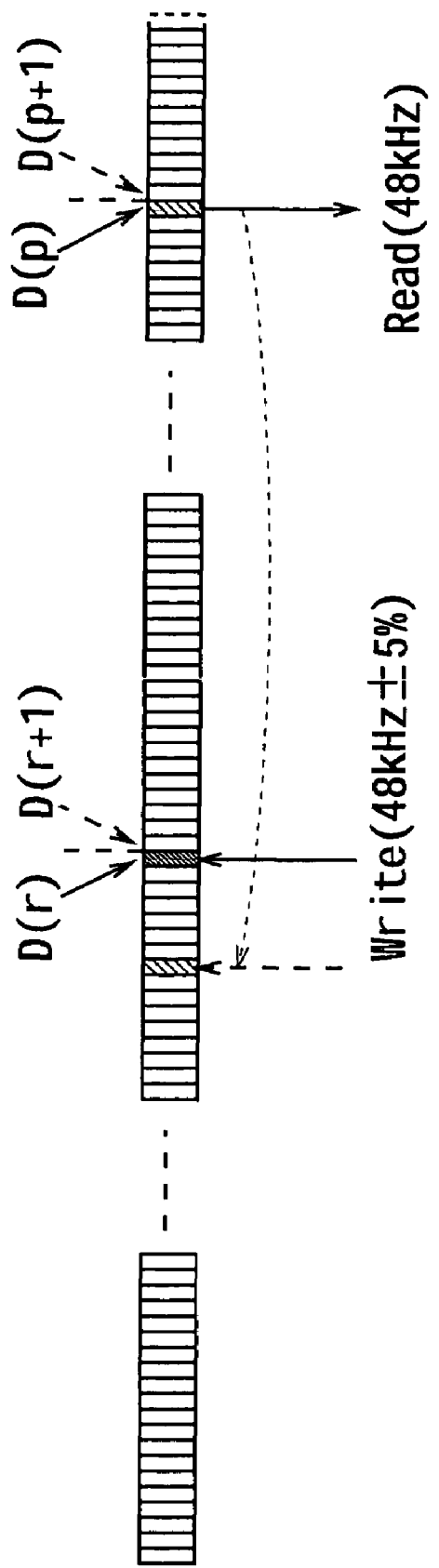
FIG. 7 shows a schematic view for use in explaining read-address jump processing.

Accordingly, as shown in FIG. 7, in case the write-data D(r) overtakes the read-data D(p) due to the difference of speed between writing speed and reading speed, the audio input/output control apparatus is made to perform read-address jump processing in which a read-address is forcibly changed to a position after a write-address.

At this time, in the audio input/output control apparatus, a read-address is forcibly changed to a position after a write-address. In case the read-address jump processing is carried out without any consideration, there is raised large difference in signal level between audio data at the read-address before the address change and audio data at the read-address after the address change. Thus, the continuity of the audio data cannot be maintained, and noise may be raised.

So, in the audio input/output control apparatus, between audio data at the read-address before the address change and audio data at the read-address after the address change, a position where the signal level difference of the audio data is small is set to be a read-address after the change.

Figure 8:
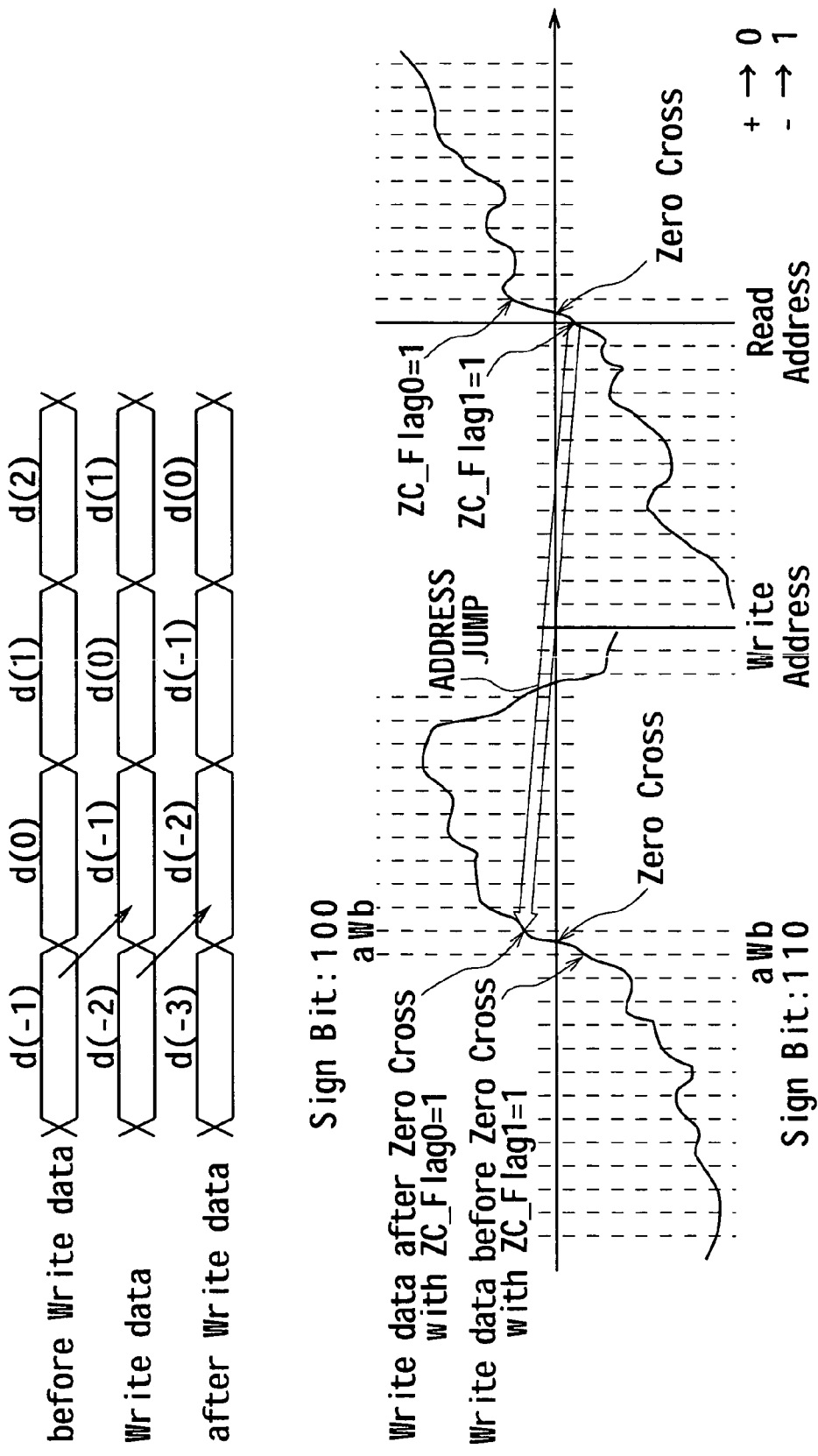
FIG. 8 shows a schematic view for use in explaining the read-address jump processing using the zero cross.

Specifically, as shown in FIG. 8, when the signal level of audio data is in the vicinity of the zero cross at which the signal level crosses the zero level, the audio input/output control apparatus forcibly causes the current read-address to address-jump to a position after a write-address.

That is, for example, when a write-address catches up a read-address, the audio input/output control apparatus sets a position, which is located after a write-address going forward from the current read-address before the address change by approximately one round of the ring buffer 10 where the signal level of the audio data is in the vicinity of the zero cross, to a read-address after the address change.

At this time, the audio input/output control apparatus is made to perform address jump processing from a read-address right before the zero cross to a read-address right after the zero cross, which can maintain the continuity of audio data between the time point before the address jump and the time point after the address jump, and does not lower the quality of audio.

The audio input/output control apparatus does not necessarily have to carry out above-described processing, and a read-address right before the zero cross may be address-jump to a read-address right before the zero cross, or a read-address right after the zero cross may be address-jump to a read-address right after the zero cross, or a read-address right after the zero cross may be address-jump to a read-address right before the zero cross.

Figure 9:
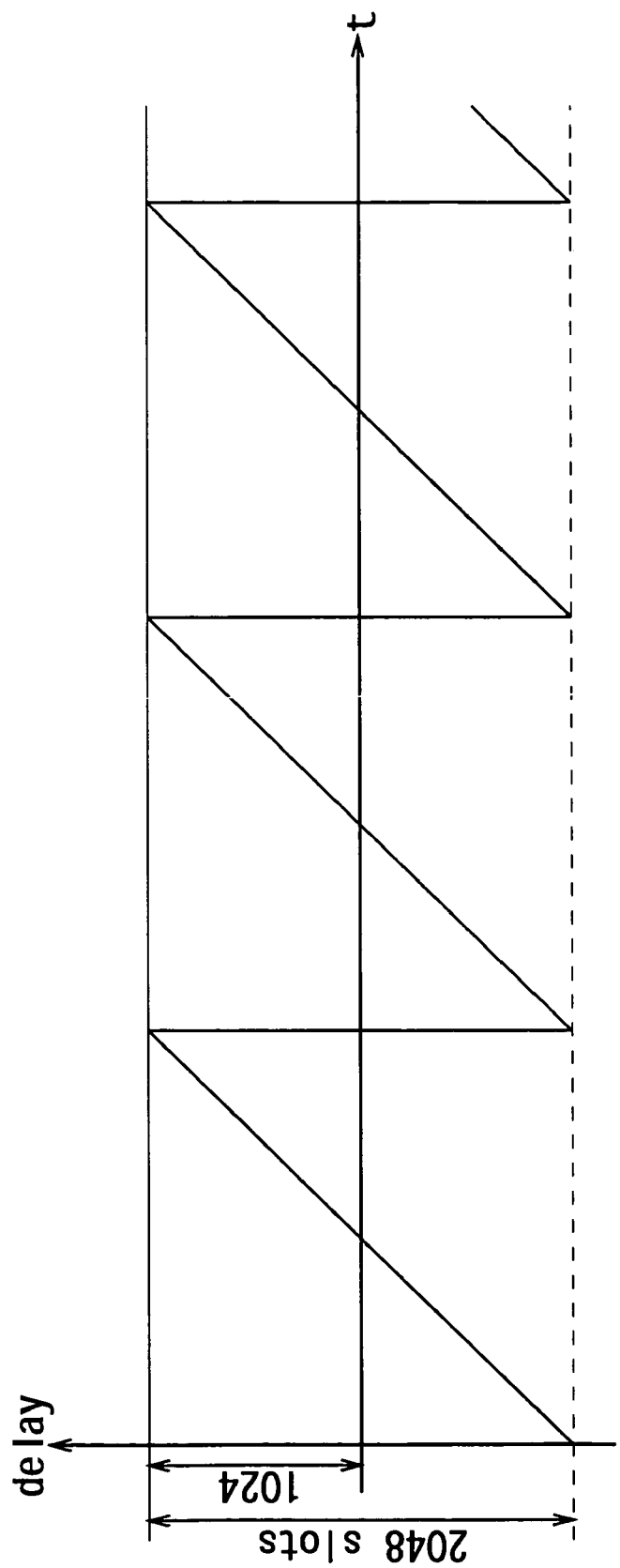
FIG. 9 shows a schematic view indicative of the change in delay amount in case writing speed is faster than reading speed.

As shown in FIG. 9, since the audio input/output control apparatus uses the ring buffer 10 having 2048 slots, in case writing speed is faster than reading speed for audio data, the delay becomes minimum at the moment when write-data overtakes read-data, and the delay gradually increases afterward.

Figure 10:
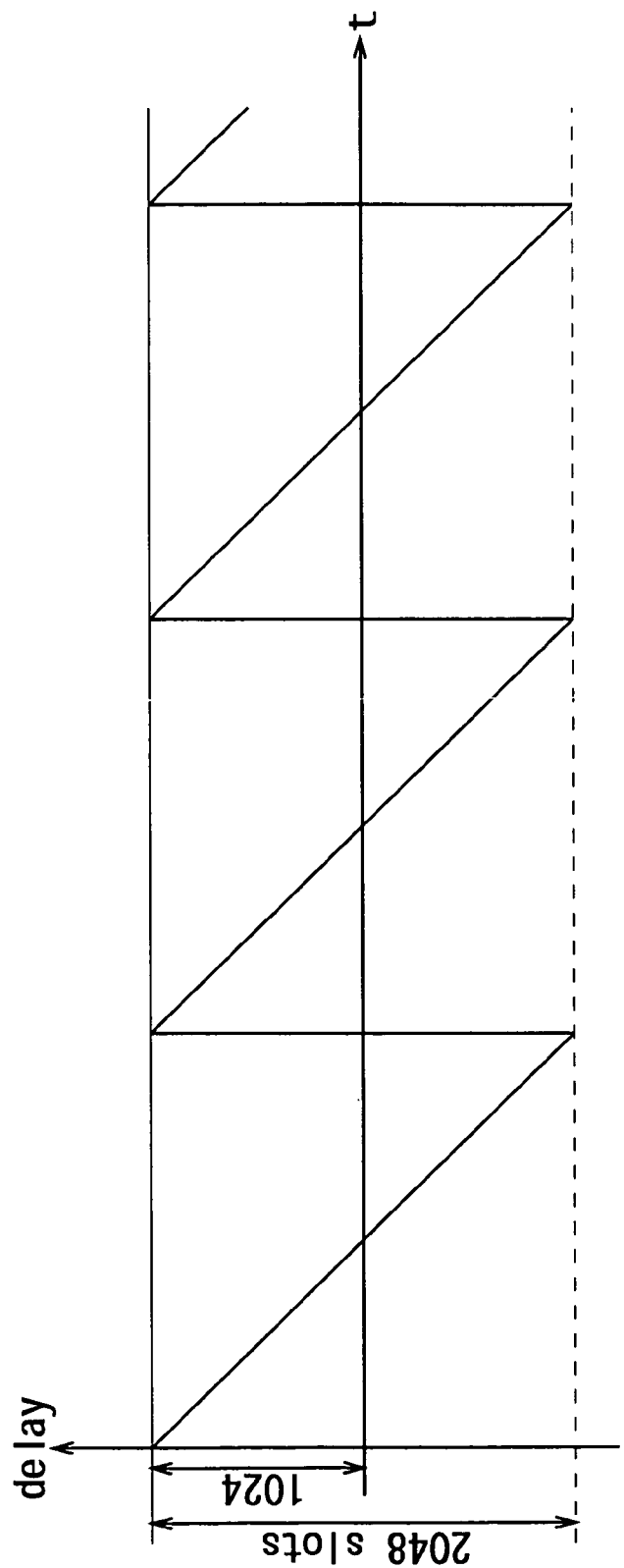
FIG. 10 shows a schematic view indicative of the change in delay amount in case reading speed is faster than writing speed.

Furthermore, as shown in FIG. 10, in the audio input/output control apparatus, in case reading speed is faster than writing speed for audio data, the delay becomes maximum at the moment when read-data overtakes write-data, and the delay gradually decreases afterward.

Accordingly, the audio input/output control apparatus sets a read-address to a position separated by half of the value of the ring buffer 10 (by 1024 slots) with respect to a write-address of audio data, and it is desired that an initial delay (21.3 msec) of 1024 slots corresponding to half round of the ring buffer 10 be retained as delay amount between the writing timing for the write-data D(r) and the reading timing for the read-data D(p).

In case writing speed is faster than reading speed, the audio input/output control apparatus causes a read-address to address-jump to a position after a write-address before read-data is caught up by write-data. At this time, since the delay amount becomes maximum, the delay is so controlled as to be in a constant range (for example, 1024 slots±100 slots) in which the delay does not widely deviates from the initial delay of 1024 slots.

Figure 11A:
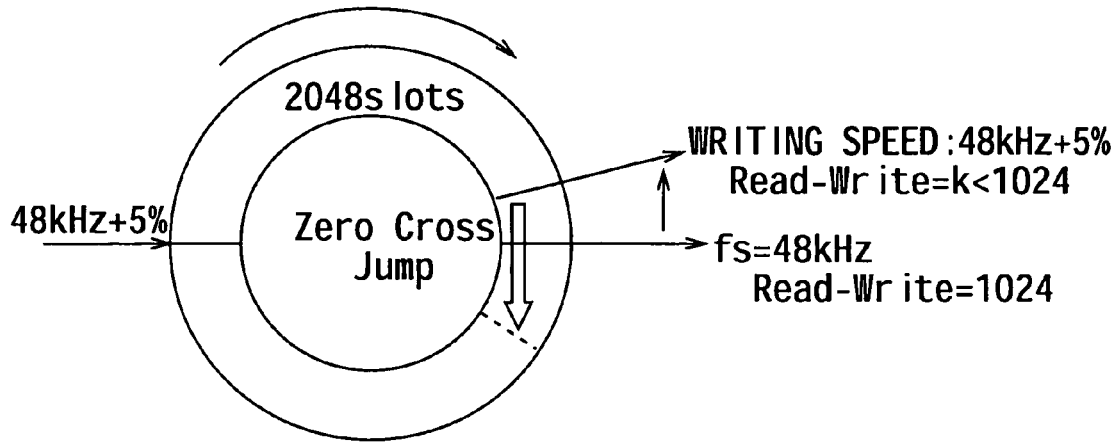
FIGS. 11A and 11B show schematic views indicative of jump timing of a read-address.

Specifically, as shown in FIG. 11A, in case writing speed is faster than reading speed, since a read-address is caught up by a write-address at some future time, the audio input/output control apparatus calculates the difference value "k" between the read-address and the write-address, and forcibly causes the read-address to address-jump to a position going forward by a short distance in case k<1024.

Accordingly, even if writing speed is faster than reading speed, since the difference value "k" between the read-address and the write-address can be kept constant to some extent, the audio input/output control apparatus can maintain a delay amount in a constant range which does not widely deviate from the initial delay of 1024 slots.

Figure 11B:
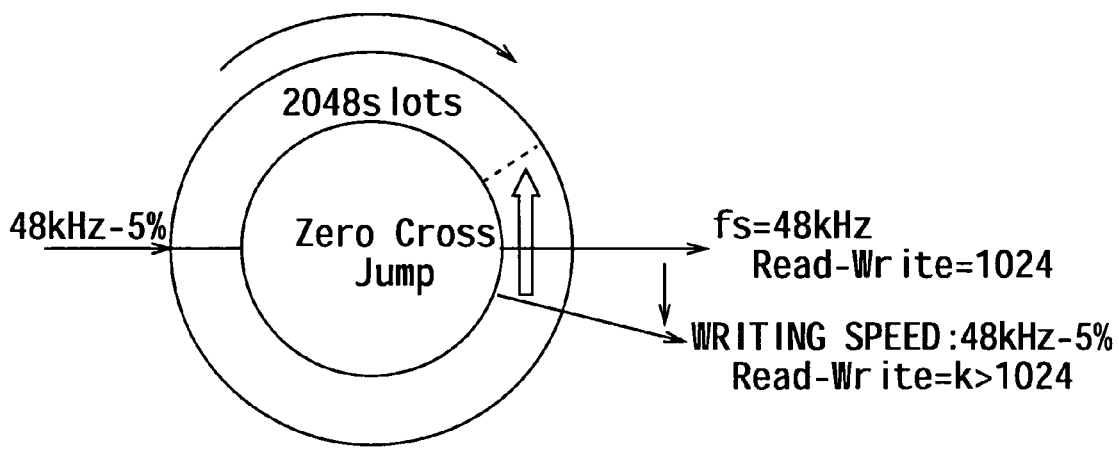

On the other hand, as shown in FIG. 11B, in case reading speed is faster than writing speed, since the difference between a read-address and a write-address is enlarged and the write-address is caught up by the read-address at some future time, the audio input/output control apparatus calculates the difference value "k" between the read-address and the write-address, and forcibly causes the read-address to address-jump to a position going backward by a short distance from the current time point in case k>1024.

Accordingly, even if reading speed is faster than writing speed, since the difference value "k" between the read-address and the write-address can be kept constant to some extent, the audio input/output control apparatus can maintain a delay amount in a constant range which does not widely deviate from the initial delay of 1024 slots.

The audio input/output control apparatus causes a read-address before the address jump and a read-address after the address jump to address-jump in the vicinity of the zero cross where the signal level difference of audio data is small.

Figure 12:
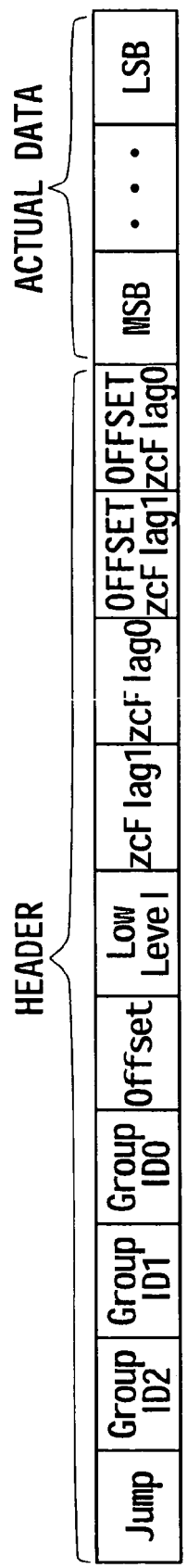
FIG. 12 show schematic views indicative of the data configuration of audio data.

Audio data written in the ring buffer 10 under slot unit is composed of actual data indicated by data from the Most Significant Bit (MSB) to the Least Significant Bit (LSB) and header written in the former stage of the actual data, as shown in FIG. 12.

In the header of the audio data, in case there exists audio data that should address-jump based on whether or not the audio data is in the vicinity of the zero cross as "Jump", flag information representing that the current address is the jump address (to be described later in detail) is written, and group ID that identifies a group obtained by associating desired tracks among twelve tracks to form one group is written as "GroupID2", "GroupID1", "GroupID0", and an off set amount for removing direct current component overlapped on audio data after analog-to-digital conversion is written as "Offset".

Figure 13:
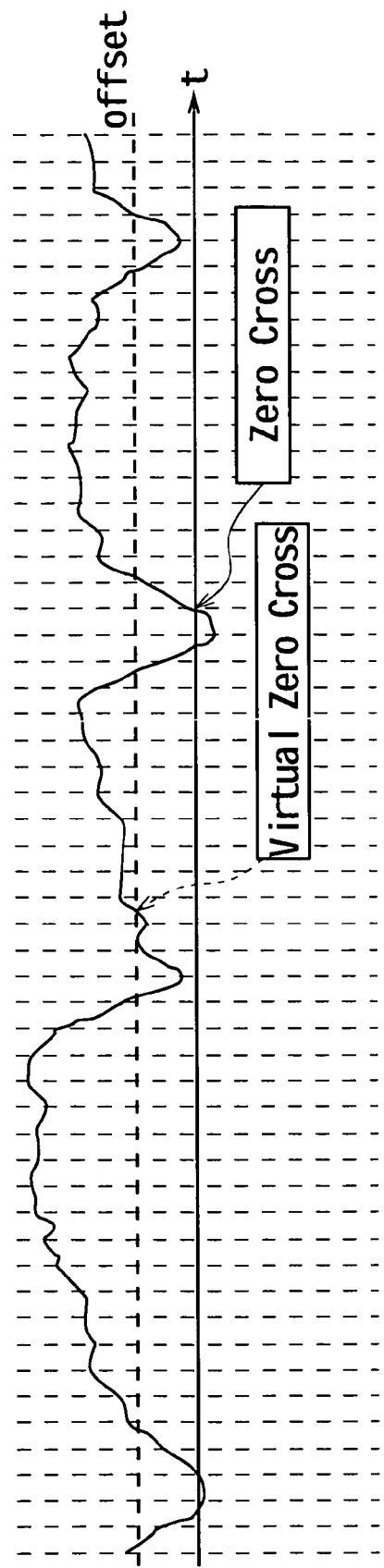
FIG. 13 shows a schematic view indicative of the waveform of audio data on which direct current component is overlapped.

As shown in FIG. 13, in case direct current component is overlapped on audio data, the signal level of the entire waveform is raised due to the direct current component, and the zero cross of original audio data on which the direct current component in not overlapped cannot be undesirably detected.

So, the audio input/output control apparatus is made to detect the offset amount for removing direct current component in advance, and write thus detected offset amount in the "Offset" of header information of audio data. Thus, with respect to audio data on which direct current component is overlapped, the audio input/output control apparatus detects the zero cross of original audio data on which direct current component is not overlapped by detecting the virtual zero cross of the audio data that has its direct current component removed in advance.

In the header of the audio data (FIG. 12), in case audio data is of low level of −60 dB or lower, this information is written as "Low level", and flag information is written as "zcFlag1" in case audio data is right before the zero cross (FIG. 8), and flag information is written as "zcFlag0" in case audio data is right after the zero cross (FIG. 8).

Accordingly, the audio input/output control apparatus can instantly judge whether the signal level of the audio data is right before the zero cross or right after the zero cross by referring to the header of audio data every 2048 slots and confirming the flag information of the "zcFlag1" or "zcFlag0".

In the header of audio data, as for audio data on which direct current component is overlapped, flag information is written as "offset zcFlag1" when original audio data on which direct current component is not overlapped is right before the zero cross, and flag information is written as "offset zcFlag0" when original audio data on which direct current component is not overlapped is right after the zero cross.

As shown in FIG. 8, the audio input/output control apparatus monitors the signal level of audio data under slot unit of the ring buffer 10, and as a result, sets "1" as a sign bit when the signal level of the audio data is equal to or less than the zero level, while sets "0" as a sign bit when the signal level of the audio data goes beyond the zero level.

Accordingly, the audio input/output control apparatus sets "1" as a sign bit since the signal level of audio data that is written at a point right before the zero cross (indicated by "W") is equal to or less than the zero level, and sets "1" as a sign bit since the signal level of audio data at a point going backward by one point (indicated by "a") is also equal to or less than the zero level, and sets "0" as a sign bit since the signal level of audio data at a point going forward by one point from the point right before the zero cross (indicated by "b") goes beyond the zero level.

Similarly, the audio input/output control apparatus sets "0" as a sign bit since the signal level of audio data that is written at a point right after the zero cross (indicated by "W") goes beyond the zero level, and sets "1" as a sign bit since the signal level of audio data at a point going backward by one point (indicated by "a") is equal to or less than the zero level, and sets "0" as a sign bit since the signal level of audio data at a point going forward by one point from the point right after the zero cross (indicated by "b") goes beyond the zero level.

Accordingly, the audio input/output control apparatus can judge that a timing at which the sign bit changes from "1" to "0" is the zero cross by monitoring the sign bit every slot, and figures out that a slot in which the sign bit indicates "1" is audio data right before the zero cross to set "1" as flag information of the "zcFlag1", and figures out that a slot in which the sign bit indicates "0" is audio data right after the zero cross to set "0" as flag information of the "zcFlag0".

As for flag information of the "offset zcFlag1" and "offset zcFlag0", the audio input/output control apparatus sets "1" or "0" based on the sign bit similar to the "zcFlag1" and "zcFlag0".

(2) Configuration of Audio Input/output Control Apparatus

Figure 14:
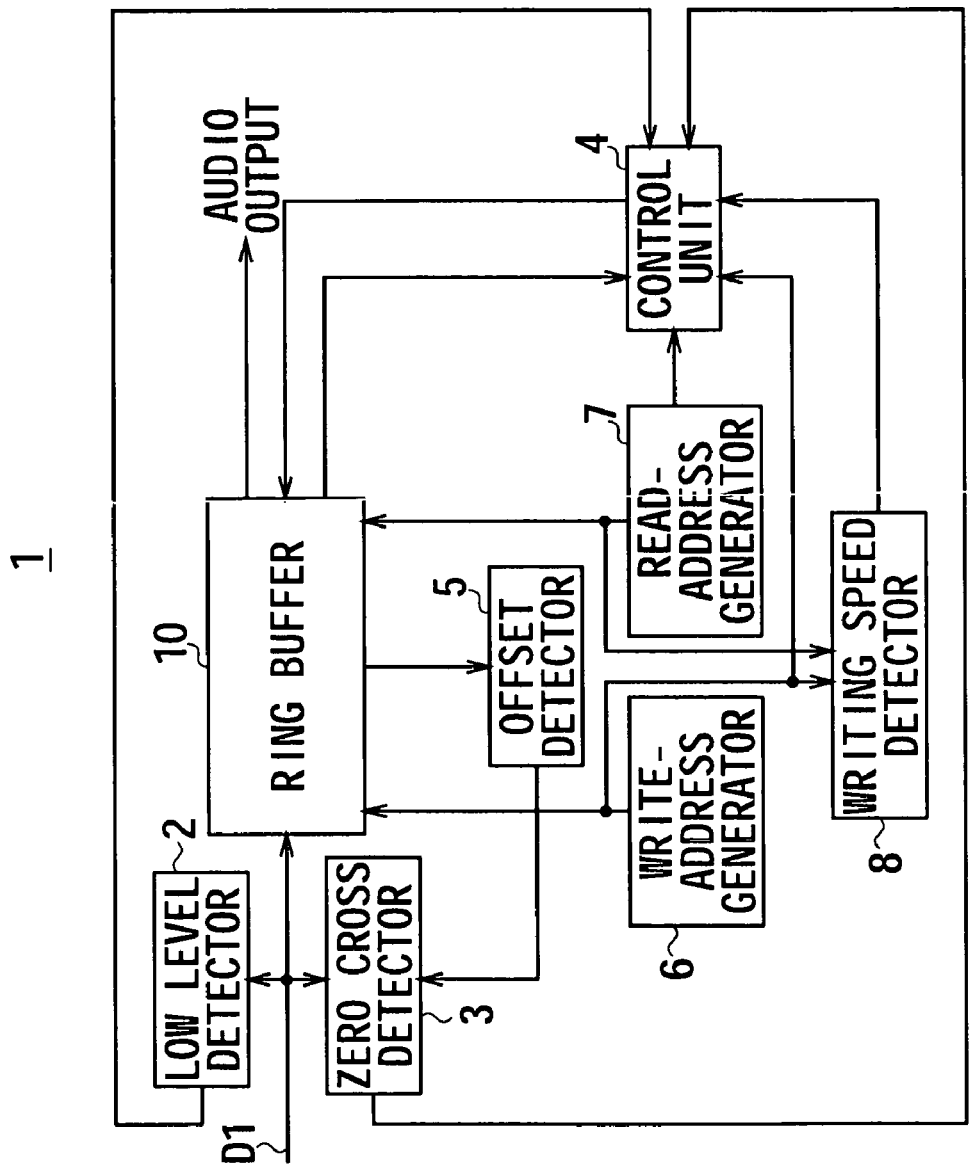
FIG. 14 shows a block diagram indicative of the circuit configuration of the audio input/output control apparatus.

Actually, as shown in FIG. 14, a low level detector 2, zero cross detector 3, and the ring buffer 10 of an audio input/output control apparatus 1 receives audio data D1 every 2048 samples in conformity to the ring buffer 10 of 2048 slots.

So as to make a control unit 4 configured by a Central Processing Unit (CPU) determine the zero cross, the low level detector 2 detects that the signal level of the audio data D1 is of low level of −60 dB or lower, and outputs the detection result to the control unit 4.

Figure 15:
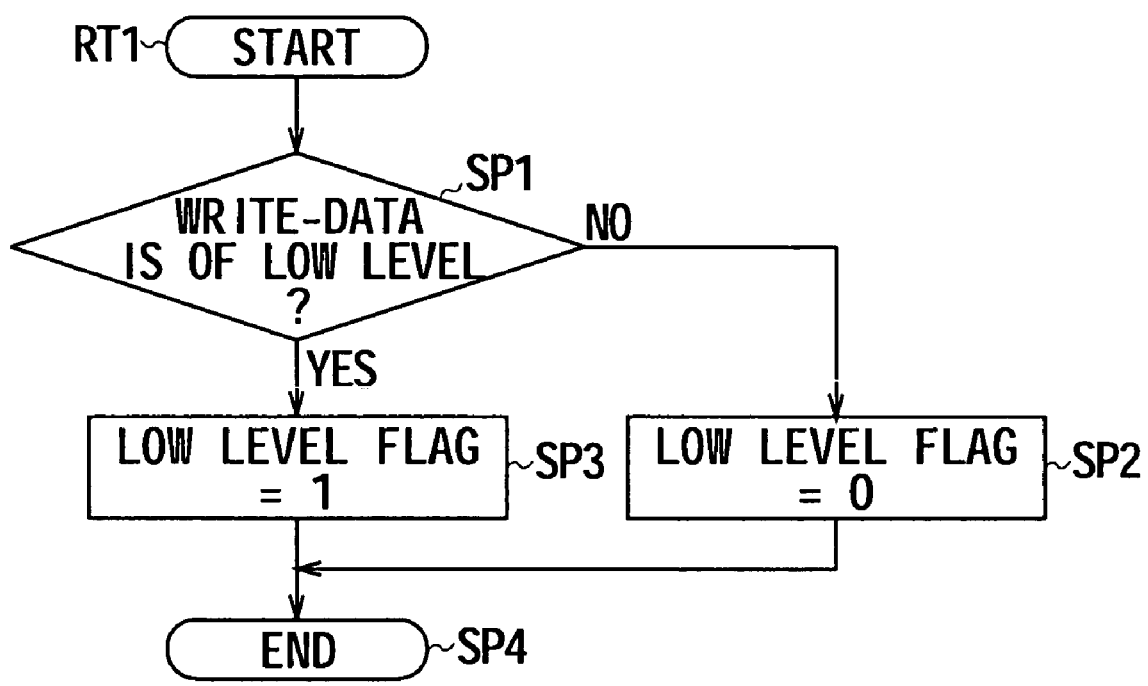
FIG. 15 shows a flow chart for use in explaining low level detection processing.

Actually, as shown in FIG. 15, the low level detector 2 goes from the beginning step of a routine RT1 to the next step SP1, and judges whether or not the signal level of the audio data D1 to be written to the ring buffer 10 is of low level.

In case negative result is obtained, the low level detector 2 goes to the next step SP2 and sets "0" as a low level flag, and goes to the next step SP4 to end the processing. On the other hand, in case positive result is obtained in step SP1, the low level detector 2 goes to the next step SP3 and sets "1" as a low level flag, and goes to the next step SP4 to end the processing.

The zero cross detector 3 detects whether or not the signal level of the audio data crosses the "0" level by monitoring the signal level of the audio data D1, and sends the detection result to the control unit 4.

Figure 16:
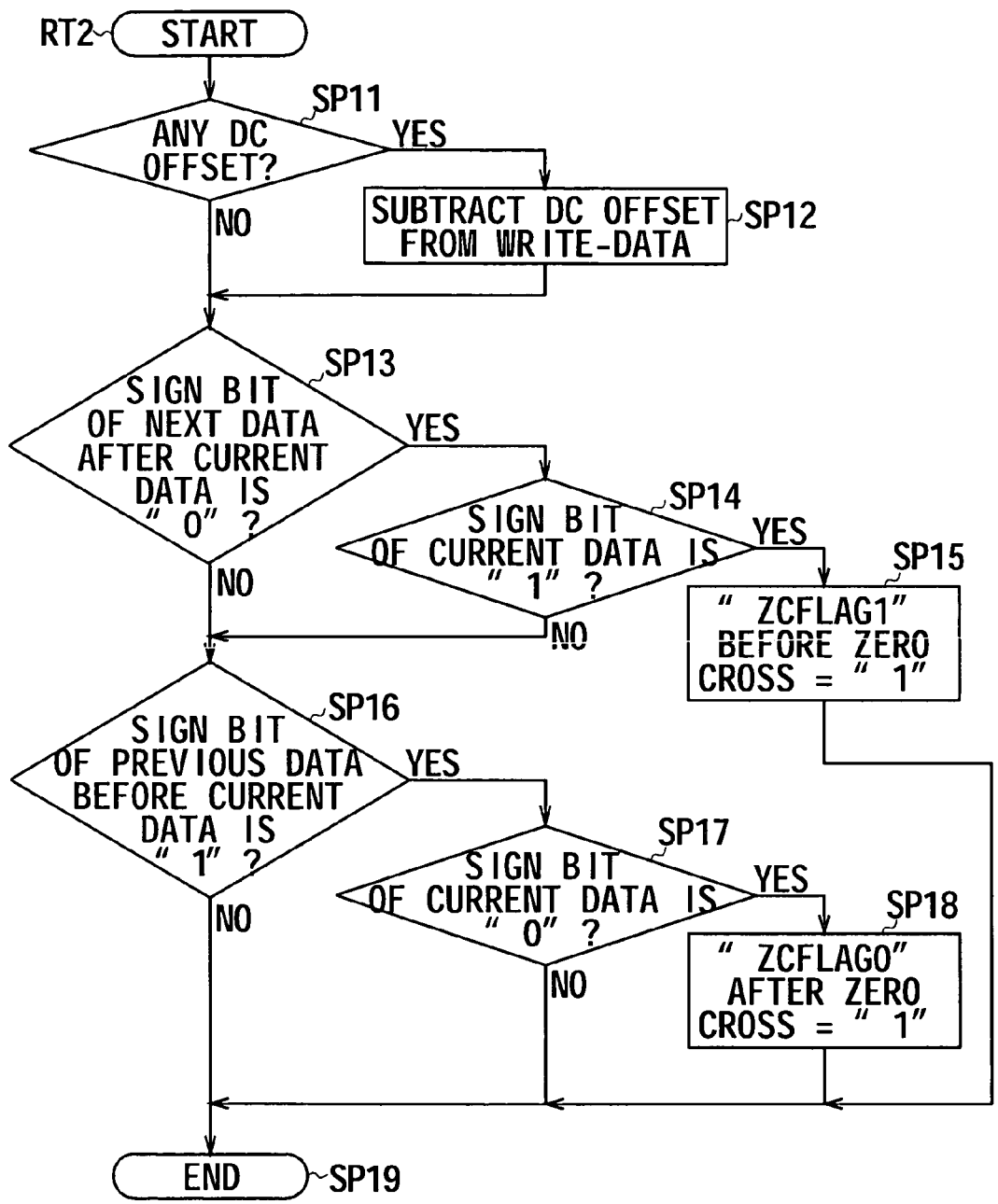
FIG. 16 shows a flow chart for use in explaining zero cross detection processing.

Actually, as shown in FIG. 16, the zero cross detector 3 goes from the beginning step of a routine RT2 to the next step SP11, and judges whether or not direct current component is overlapped on the audio data D1 based on the detection result of an offset detector 5.

Figure 17:
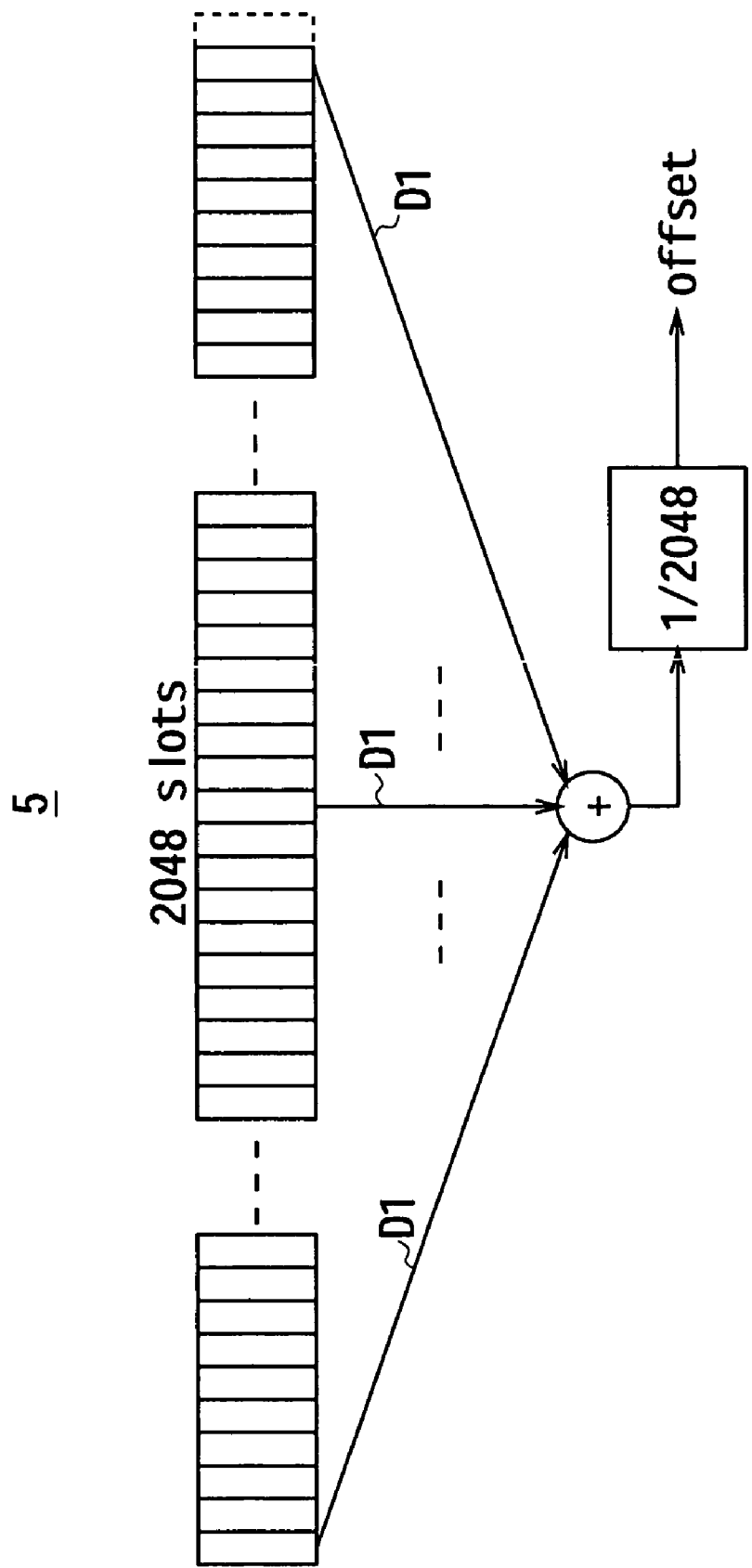
FIG. 17 shows a schematic view indicative of the configuration of an offset detector.

As shown in FIG. 17, the offset detector 5 calculates the average value by dividing the total value of the signal level of the audio data D1 to be sequentially written to 2048 slots of the ring buffer 10 by 2048, and detects the average value as an offset amount of the direct current component.

In case negative result is obtained in step SP11, since direct current component is not overlapped on the audio data D1, the offset detector 5 goes to the next step SP13 without performing any processing.

On the other hand, in case positive result is obtained in step SP11, since direct current component is overlapped on the audio data D1, the offset detector 5 goes to step SP12 and judges afterward on the basis of the virtual zero cross that is obtained by assuming that there is no direct current component overlapped on the audio data D1 to be written to the ring buffer 10, and goes to the next step SP13.

In step SP13, as shown in FIG. 8, the offset detector 5 judges whether or not the sign bit of the audio data D1 at the next point (indicated by "b") after the current point (indicated by "W") is "0", and goes to the next step SP16 in case negative result is obtained, while goes to the next step SP14 in case positive result is obtained.

In step SP14, the offset detector 5 judges whether or not the sign bit of the audio data D1 at the current point (indicated by "W") is "1", and goes to the next step SP 16 in case negative result is obtained, which indicates that the sign bits being an array of "Wb" is "00" and there is no zero cross.

On the other hand, in case positive result is obtained in step SP14, which indicates that the sign bits being an array of "Wb" is "10" and there is a zero cross, the offset detector 5 goes to the next step SP15 to set "1" as flag information of the "zcFlag1" right before the zero cross, and then goes to the step SP19 to end the processing.

In step SP16, the offset detector 5 judges whether or not the sign bit of the audio data D1 at the previous point (indicated by "a") before the current point (indicated by "W") is "1", and goes to step SP19 to end the processing in case negative result is obtained, while goes to step SP17 in case positive result is obtained.

In step SP17, the offset detector 5 judges whether or not the sign bit of the audio data D1 at the current point (indicated by "W") is "0", and goes to the next step SP 19 in case negative result is obtained, which indicates that the sign bits being an array of "aw" is "11" and there is no zero cross to end the processing.

On the other hand, in case positive result is obtained in step SP17, which indicates that the sign bits being an array of "aw" is "10" and there is a zero cross, the offset detector 5 goes to the step SP18 to set "1" as flag information of the "zcFlag0" right after the zero cross, and then goes to the step SP19 to end the processing.

As described above, the ring buffer 10 is of 2048 slots, and the input audio data D1 is written thereto every slot under writing speed of 48 kHz±5% in accordance with a write-address supplied from a write-address generator 6, and the audio data D1 is read out therefrom to be output under constant reading speed of 48 kHz in accordance with a read-address supplied from a read-address generator 7.

At this time, the write-address generator 6 and the read-address generator 7 are so configured as to send the write-address and read-address to a writing speed detector 8 as well as to the control unit 4.

The writing speed detector 8 detects the speed difference between the writing speed and the reading speed by calculating the difference value "k" of the read-address and the write-address, and sends the difference value "k" to the control unit 4.

Based on the read-address, the write-address and the difference value "k" of the read-address and the write-address, the control unit 4 determines a read-address after address change which becomes the address jump destination by judging to which address the read-address at the current point before address change should address-jump, and designates a read-address after the address change to the ring buffer 10.

(3) Address Jump Processing Procedure

Next, address jump processing procedure for causing a read-address to address-jump according to the speed difference between writing speed and reading speed for the ring buffer 10, which is performed by the control unit 4 of the audio input/output control apparatus 1, will be explained. The processing will be explained for the case in which writing speed is faster than reading speed, and for the case in which reading speed is faster than writing speed.

Figure 18:
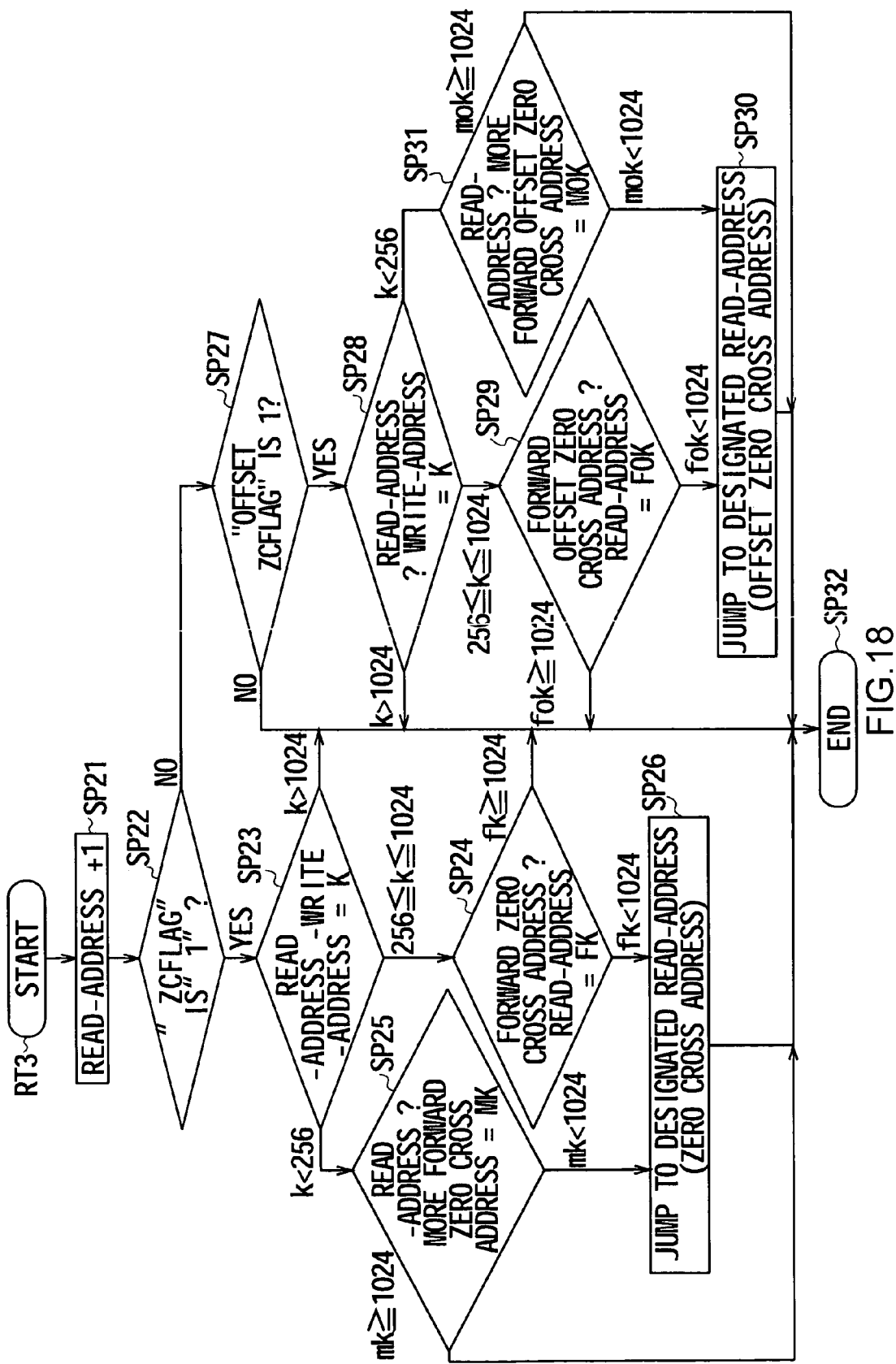
FIG. 18 shows a flow chart indicative of the read-address jump processing in case writing speed is faster than reading speed.

(3-1) Read-Address Jump Processing Procedure for the Case in which Writing Speed is Faster than Reading Speed The case in which the control unit 4 of the audio input/output control apparatus 1 carries out read-address jump processing in accordance with an address jump processing program being an application program to maintain the continuity of audio without raising tone interval change of the audio in case writing speed is faster than reading speed for audio data according to the variable-speed reproduction processing for video when the program play function of a video tape recorder is operated will be explained using a flow chart shown in FIG. 18.

Actually, the control unit 4 of the audio input/output control apparatus 1 goes from the beginning step of a routine RT3 to step SP21, and goes to the next read-address by adding "1" to a read-address at the current point to be read out from the ring buffer 10 to go to the next step SP 22.

In step SP22, the control unit 4 refers to the header of the audio data D1 written in a slot of the ring buffer 10 corresponding to the next read-address, and judges whether or not "1" is set for flag information of the "zcFlag1" or "zcFlag0" of the header.

In case positive result is obtained, which indicates that "1" is set for flag information of the "zcFlag1" or "zcFlag0", and the audio data D1 to be read out from the next read-address is data right before the zero cross or right after the zero cross, the control unit 4 goes to the next step SP23.

In step SP23, the control unit 4 calculates the difference value "k" between the read-address and the write-address using the writing speed detector 8, and judges whether the difference value "k" is smaller than 256 (slots), or the difference value "k" is larger than 1024 (slots), or the difference value "k" is in the range from 256 (slots) to 1024 (slots).

Figure 19:
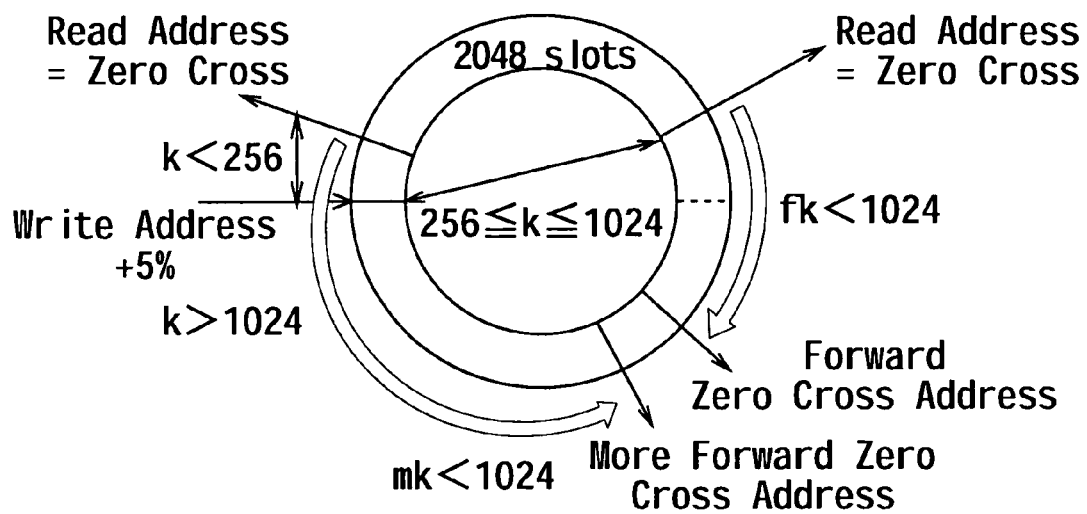
FIG. 19 shows a schematic view indicative of the image of address jump in case writing speed is faster than reading speed.

As shown in FIG. 19, in case the difference value "k" is larger than 1024 (slots), which indicates that there is enough time by the time when the read-address is caught up by the write-address, the control unit 4 goes to step SP 32 to end the processing without performing the read-address jump processing.

On the other hand, in case the difference value "k" is in the range from 256 (slots) to 1024 (slots), which indicates that the write-address is gradually coming close to the read-address, and there is raised possibility that the difference between the read-address and the write-address deviates from a constant range (for example, 1024 slots±100 slots) of the initial delay, the control unit 4 goes to the next step SP24.

In step SP24, in causing the read-address to address-jump, the control unit 4 sets a read-address to be address-jumped that is located in the vicinity of the zero cross where the signal level change of the audio data D1 is small and at a forward point near the read-address to a forward zero cross address, and calculates the difference "fk" between the forward zero cross address and the read-address.

In case the difference "fk" is equal to 1024 (slots) or more, when the read-address is address-jumped to the forward zero cross address, the possibility of deviating from a constant range (for example, 1024 slots±100 slots) of the initial delay is high. So, the control unit 4 goes to step SP32 to end the processing without performing the read-address jump processing.

On the other hand, in case the difference "fk" is smaller than 1024 (slots), even if the read-address is address-jumped to the forward zero cross address, the possibility of falling in a constant range (for example, 1024 slots±100 slots) of the initial delay is high. So, the control unit 4 goes to step SP26 to perform the read-address jump processing.

In step SP23, in case the difference value "k" is smaller than 256 (slots), which indicates that the read-address is just about to be caught up by the write-address, and the control unit 4 goes to the next step SP25.

In step SP25, in causing the read-address to address-jump, the control unit 4 sets a read-address to be address-jumped that is located in the vicinity of the zero cross where the signal level change of the audio data D1 is small and at a forward point far from the read-address to a more forward zero cross address, and calculates the difference "mk" between the read-address and the more forward zero cross address.

In case the difference "mk" is equal to 1024 (slots) or more, when the read-address is address-jumped to the more forward zero cross address, the possibility of deviating from a constant range (for example, 1024 slots±100 slots) of the initial delay is high. So, the control unit 4 goes to step SP32 to end the processing without performing the read-address jump processing.

On the other hand, in case the difference "mk" is smaller than 1024 (slots), even if the read-address is address-jumped to the more forward zero cross address, the possibility of falling in a constant range (for example, 1024 slots±100 slots) of the initial delay is high. So, the control unit 4 goes to step SP26 to perform the read-address jump processing.

In step SP26, the control unit 4 data-clips the audio data D1 by causing the read-address to address-jump to the forward zero cross address or to the more forward zero cross address so as to prevent the read-address from being caught up by the write-address in advance, and maintains the continuity of the audio data D1 read out before the address jump and the audio data D1 to be read out after the address jump, and then goes to step SP32 to end the processing.

On the other hand, in case negative result is obtained in step SP22, which indicates that "0" is set for flag information of the "zcFlag1" or "zcFlag0", and the audio data D1 is unrelated to the zero cross, the control unit 4 goes to the next step SP27.

Even if the audio data D1 is unrelated to the zero cross, there is possibility that the zero cross cannot be detected since direct current component is overlapped on the audio data D1, the control unit 4 goes to the processing of the next step SP27 and the following processing.

In step SP27, the control unit 4 refers to the header of the audio data D1, and judges whether or not "1" is set for flag information of the "offset zcFlag1" or "offset zcFlag0" of the header.

In case negative result is obtained, which indicates that "0" is set for flag information of the "zcFlag1" or "zcFlag0" and that of the "offset zcFlag1" or "offset zcFlag0", that is, both the audio data D1 on which direct current component is not overlapped and the audio data D1 on which direct current component is overlapped do not zero cross, and the timing is not for read-address jump processing, the control unit 4 goes to step SP32 to end the processing.

On the other hand, in case positive result is obtained in step SP27, which indicates that the virtual zero cross (FIG. 13) is detected in case the audio data D1 on which direct current component is overlapped is considered to be the audio data D1 that has its direct current component removed, the control unit 4 goes to the next step SP28.

In step SP28, the control unit 4 calculates the difference value "k" between the read-address and the write-address using the writing speed detector 8, and judges whether the difference value "k" is smaller than 256 (slots), or the difference value "k" is larger than 1024 (slots), or the difference value "k" is in the range from 256 (slots) to 1024 (slots).

In case the difference value "k" is larger than 1024 (slots), which indicates that there is enough time by the time when the read-address is caught up by the write-address, the control unit 4 goes to step SP 32 to end the processing without performing the read-address jump processing, similar to the above-described step SP23.

On the other hand, in case the difference value "k" is in the range from 256 (slots) to 1024 (slots), which indicates that the write-address is gradually coming close to the read-address, and there is raised possibility that the difference between the read-address and the write-address deviates from a constant range (for example, 1024 slots±100 slots) of the initial delay, the control unit 4 goes to the next step SP29.

In step SP29, in causing the read-address to address-jump, the control unit 4 sets a read-address to be address-jumped that is located in the vicinity of the zero cross where the signal level change of the audio data D1 is small and at a forward point near the read-address to a forward offset zero cross address, and calculates the difference "fok" between the forward offset zero cross address and the read-address at the current point.

In case the difference "fok" is equal to 1024 (slots) or more, when the read-address is address-jumped to the forward offset zero cross address, the possibility of deviating from a constant range (for example, 1024 slots±100 slots) of the initial delay is high. So, the control unit 4 goes to step SP32 to end the processing without performing the read-address jump processing.

On the other hand, in case the difference "fok" is smaller than 1024 (slots), even if the read-address is address-jumped to the forward offset zero cross address, the possibility of falling in a constant range (for example, 1024 slots±100 slots) of the initial delay is high. So, the control unit 4 goes to step SP30 to perform the read-address jump processing.

In step SP28, in case the difference value "k" is smaller than 256 (slots), which indicates that the read-address is just about to be caught up by the write-address, and the control unit 4 goes to the next step SP31.

In step SP31, in causing the read-address to address-jump, the control unit 4 sets a read-address to be address-jumped that is located in the vicinity of the zero cross where the signal level change of the audio data D1 is small and at a forward point far from the read-address to a more forward offset zero cross address, and calculates the difference "mok" between the more forward offset zero cross address and the read-address at the current point.

In case the difference "mok" is equal to 1024 (slots) or more, when the read-address is address-jumped to the more forward offset zero cross address, the possibility of deviating from a constant range (for example, 1024 slots±100 slots) of the initial delay is high. So, the control unit 4 goes to step SP32 to end the processing without performing the read-address jump processing.

On the other hand, in case the difference "mok" is smaller than 1024 (slots), even if the read-address is address-jumped to the more forward offset zero cross address, the possibility of falling in a constant range (for example, 1024 slots±100 slots) of the initial delay is high. So, the control unit 4 goes to step SP30 to perform the read-address jump processing.

In step SP30, the control unit 4 data-clips the audio data D1 on which direct current component is overlapped by causing the read-address to address-jump to the forward offset zero cross address or to the more forward offset zero cross address so as to prevent the read-address from being caught up by the write-address in advance, and maintains the continuity of the audio data D1, on which direct current component is overlapped, read out before the address jump and the audio data D1, on which direct current component is overlapped, to be read out after the address jump, and then goes to step SP32 to end the processing.

Figure 20:
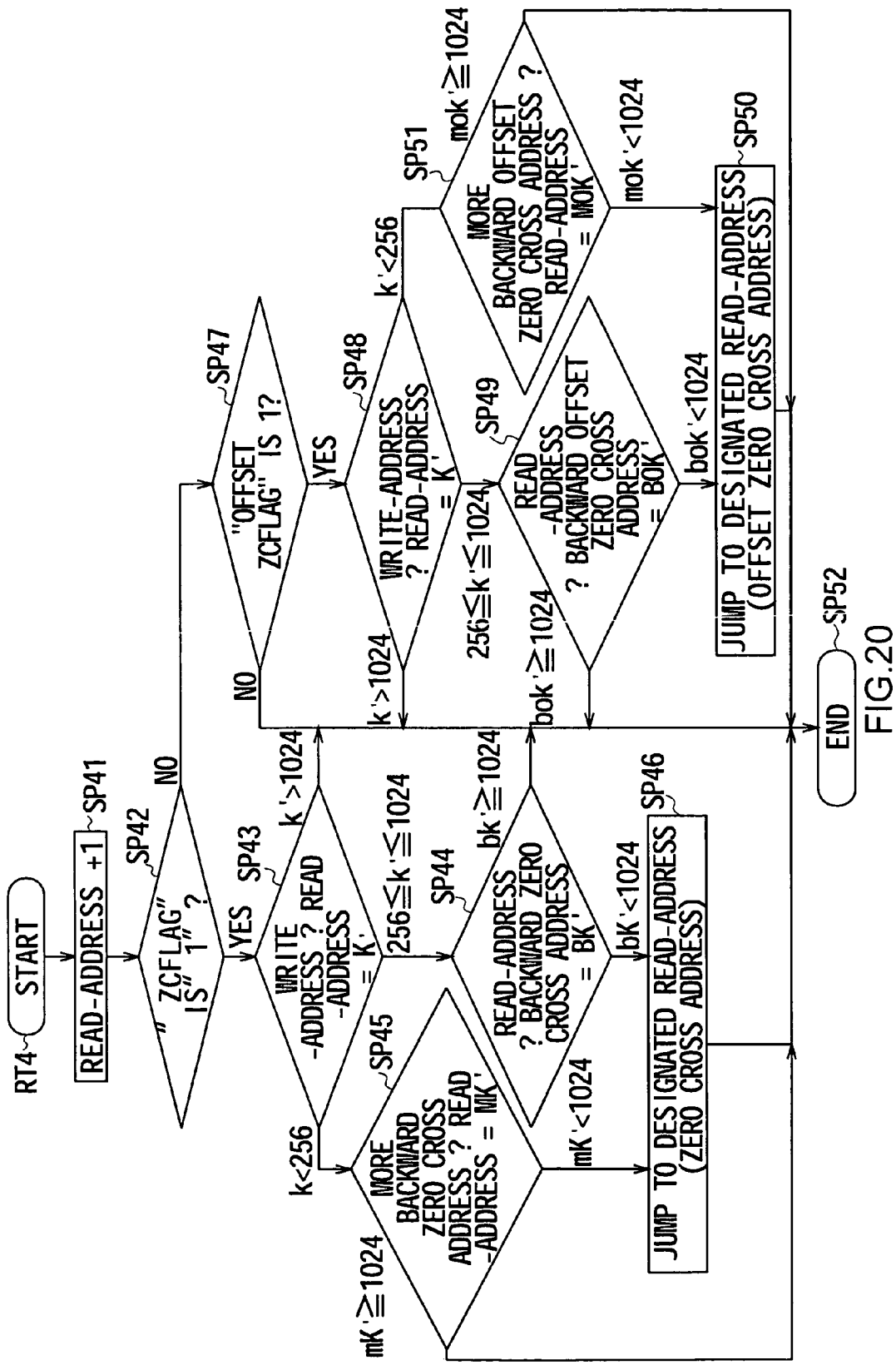
FIG. 20 shows a flow chart indicative of the read-address jump processing in case reading speed is faster than writing speed.

(3-2) Read-Address Jump Processing Procedure for the Case in which Reading Speed is Faster than Writing Speed The case in which the control unit 4 of the audio input/output control apparatus 1 carries out read-address jump processing in accordance with an address jump processing program being an application program to maintain the continuity of audio without raising tone interval change of the audio in case reading speed is faster than writing speed for audio data D1 according to the variable-speed reproduction processing for video when the program play function of a video tape recorder is operated will be explained using a flow chart shown in FIG. 20.

Actually, the control unit 4 of the audio input/output control apparatus 1 goes from the beginning step of a routine RT4 to step SP41, and goes to the next read-address by adding "1" to a read-address at the current point to be read out from the ring buffer 10 to go to the next step SP 42.

In step SP42, the control unit 4 refers to the header of the audio data D1 written in a slot of the ring buffer 10 corresponding to the next read-address, and judges whether or not "1" is set for flag information of the "zcFlag1" or "zcFlag0" of the header.

In case positive result is obtained, which indicates that "1" is set for flag information of the "zcFlag1" or "zcFlag0", and the audio data D1 to be read out from the next read-address is data right before the zero cross or right after the zero cross, the control unit 4 goes to the next step SP43.

In step SP43, the control unit 4 calculates the difference value "k'" between the write-address and the read-address using the writing speed detector 8, and judges whether the difference value "k'" is smaller than 256 (slots), or the difference value "k'" is larger than 1024 (slots), or the difference value "k'" is in the range from 256 (slots) to 1024 (slots).

Figure 21:
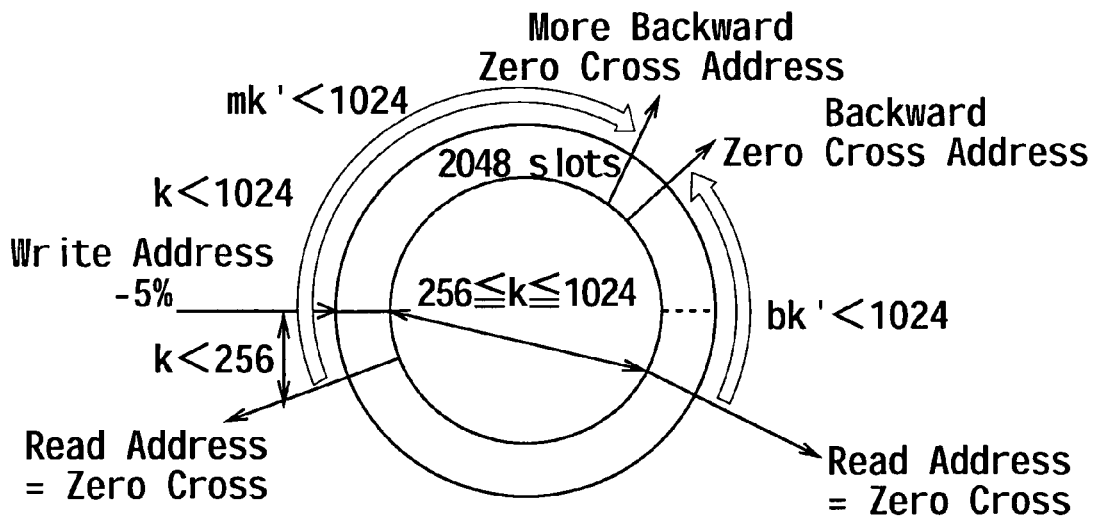
FIG. 21 shows a schematic view indicative of the image of address jump in case reading speed is faster than writing speed.

As shown in FIG. 21, in case the difference value "k'" is larger than 1024 (slots), which indicates that there is enough time by the time when the write-address is caught up by the read-address, the control unit 4 goes to step SP 52 to end the processing without performing the read-address jump processing.

On the other hand, in case the difference value "k'" is in the range from 256 (slots) to 1024 (slots), which indicates that the read-address is gradually coming close to the write-address, and there is raised possibility that the difference between the write-address and the read-address deviates from a constant range (for example, 1024 slots±100 slots) of the initial delay, the control unit 4 goes to the next step SP44.

In step SP44, in causing the read-address to address-jump, the control unit 4 sets a read-address to be address-jumped that is located in the vicinity of the zero cross where the signal level change of the audio data D1 is small and at a backward point going backward slightly from the read-address to a backward zero cross address, and calculates the difference "bk'" between the read-address and the backward zero cross address.

In case the difference "bk'" is equal to 1024 (slots) or more, when the read-address is address-jumped to the backward zero cross address, the possibility of deviating from a constant range (for example, 1024 slots±100 slots) of the initial delay is high. So, the control unit 4 goes to step SP52 to end the processing without performing the read-address jump processing.

On the other hand, in case the difference "bk'" is smaller than 1024 (slots), even if the read-address is address-jumped to the backward zero cross address, the possibility of falling in a constant range (for example, 1024 slots±100 slots) of the initial delay is high. So, the control unit 4 goes to step SP46 to perform the read-address jump processing.

In step SP43, in case the difference value "k'" is smaller than 256 (slots), which indicates that the write-address is just about to be caught up by the read-address, and the control unit 4 goes to the next step SP45.

In step SP45, in causing the read-address to address-jump, the control unit 4 sets a read-address to be address-jumped that is located in the vicinity of the zero cross where the signal level change of the audio data D1 is small and at a backward point going backward far from the read-address to a more backward zero cross address, and calculates the difference "mk'" between the more backward zero cross address and the read-address.

In case the difference "mk'" is equal to 1024 (slots) or more, when the read-address is address-jumped to the more backward zero cross address, the possibility of deviating from a constant range (for example, 1024 slots±100 slots) of the initial delay is high. So, the control unit 4 goes to step SP52 to end the processing without performing the read-address jump processing.

On the other hand, in case the difference "mk'" is smaller than 1024 (slots), even if the read-address is address-jumped to the more backward zero cross address, the possibility of falling in a constant range (for example, 1024 slots±100 slots) of the initial delay is high. So, the control unit 4 goes to step SP46 to perform the read-address jump processing.

In step SP46, the control unit 4 re-reads out the same audio data D1 to perform data interpolation by causing the read-address to address-jump to the backward zero cross address or to the more backward zero cross address so as to prevent the write-address from being caught up by the read-address in advance, and maintains the continuity of the audio data D1 read out before the address jump and the audio data D1 to be read out after the address jump, and then goes to step SP52 to end the processing.

On the other hand, in case negative result is obtained in step SP42, which indicates that "0" is set for flag information of the "zcFlag1" or "zcFlag0", and the audio data D1 is unrelated to the zero cross, the control unit 4 goes to the next step SP47.

Even if the audio data D1 is unrelated to the zero cross, there is possibility that the zero cross cannot be detected since direct current component is overlapped on the audio data D1, the control unit 4 goes to the processing of the next step SP47 and the following processing.

In step SP47, the control unit 4 refers to the header of the audio data D1, and judges whether or not "1" is set for flag information of the "offset zcFlag1" or "offset zcFlag0" of the header.

In case negative result is obtained, which indicates that "0" is set for flag information of the "zcFlag1" or "zcFlag0" and that of the "offset zcFlag1" or "offset zcFlag0", that is, both the audio data D1 on which direct current component is not overlapped and the audio data D1 on which direct current component is overlapped do not zero cross, and the timing is not for read-address jump processing, the control unit 4 goes to step SP52 to end the processing.

On the other hand, in case positive result is obtained in step SP47, which indicates that the virtual zero cross is detected in case the audio data D1 on which direct current component is overlapped is considered to be the audio data D1 that has its direct current component removed, the control unit 4 goes to the next step SP48.

In step SP48, the control unit 4 calculates the difference value "k'" between the write-address and the read-address using the writing speed detector 8, and judges whether the difference value "k'" is smaller than 256 (slots), or the difference value "k'" is larger than 1024 (slots), or the difference value "k'" is in the range from 256 (slots) to 1024 (slots).

In case the difference value "k'" is larger than 1024 (slots), which indicates that there is enough time by the time when the write-address is caught up by the read-address, the control unit 4 goes to step SP 52 to end the processing without performing the read-address jump processing, similar to the above-described step SP43.

On the other hand, in step SP48, in case the difference value "k'" is in the range from 256 (slots) to 1024 (slots), which indicates that the read-address is gradually coming close to the write-address, and there is raised possibility that the difference between the write-address and the read-address deviates from a constant range (for example, 1024 slots±100 slots) of the initial delay, the control unit 4 goes to the next step SP49.

In step SP49, in causing the read-address to address-jump, the control unit 4 sets a read-address to be address-jumped that is located in the vicinity of the zero cross where the signal level change of the audio data D1 is small and at a backward point going backward slightly from the read-address to a backward offset zero cross address, and calculates the difference "bok'" between the read-address and the backward offset zero cross address.

In case the difference "bok'" is equal to 1024 (slots) or more, when the read-address is address-jumped to the backward offset zero cross address, the possibility of deviating from a constant range (for example, 1024 slots±100 slots) of the initial delay is high. So, the control unit 4 goes to step SP52 to end the processing without performing the read-address jump processing.

On the other hand, in case the difference "bok'" is smaller than 1024 (slots), even if the read-address is address-jumped to the backward offset zero cross address, the possibility of falling in a constant range (for example, 1024 slots±100 slots) of the initial delay is high. So, the control unit 4 goes to step SP50 to perform the read-address jump processing.

In step SP48, in case the difference value "k'" is smaller than 256 (slots), which indicates that the write-address is just about to be caught up by the read-address, and the control unit 4 goes to the next step SP51.

In step SP51, in causing the read-address to address-jump, the control unit 4 sets a read-address to be address-jumped that is located in the vicinity of the zero cross where the signal level change of the audio data D1 is small and at a backward point going backward far from the read-address to a more backward offset zero cross address, and calculates the difference "mok'" between the more backward offset zero cross address and the read-address.

In case the difference "mok'" is equal to 1024 (slots) or more, when the read-address is address-jumped to the more backward offset zero cross address, the possibility of deviating from a constant range (for example, 1024 slots±100 slots) of the initial delay is high. So, the control unit 4 goes to step SP52 to end the processing without performing the read-address jump processing.

On the other hand, in case the difference "mok'" is smaller than 1024 (slots), even if the read-address is address-jumped to the more backward offset zero cross address, the possibility of falling in a constant range (for example, 1024 slots±100 slots) of the initial delay is high. So, the control unit 4 goes to step SP50 to perform the read-address jump processing.

In step SP50, the control unit 4 re-reads out the audio data D1 on which direct current component is overlapped to perform data interpolation by causing the read-address to address-jump to the backward offset zero cross address or to the more backward offset zero cross address so as to prevent the write-address from being caught up by the read-address in advance, and maintains the continuity of the audio data D1, on which direct current component is overlapped, read out before the address jump and the audio data D1, on which direct current component is overlapped, to be read out after the address jump, and then goes to step SP52 to end the processing.

(4) Performance and Effect

In the above-described configuration, in writing the audio data D1 to the ring buffer 10 under writing speed of 48 kHz±5%, and reading out the audio data D1 from the ring buffer 10 under constant reading speed of 48 kHz, the control unit 4 of the audio input/output control apparatus 1 detects the speed difference between the writing speed and the reading speed to forcibly cause the read-address to address-jump according to thus detected speed difference so as to prevent the write-address from overtaking the read-address or prevent the read-address from overtaking the write-address.

At this time, the control unit 4 of the audio input/output control apparatus 1 causes the read-address to address-jump such that a read-address right before the zero cross and a read-address right after the zero cross are connected, which can significantly reduces the signal level change between the audio data D1 corresponding to a read-address before address jump and the audio data D1 corresponding to a read-address after address jump. Accordingly, even if the continuity of the audio data D1 is actually intermitted due to the address jump, the user feels that the continuity of the audio data D1 can be maintained in auditory sense, and audio free from tone interval change can be output.

The control unit 4 of the audio input/output control apparatus 1 data-clips the audio data D1 in case of making the read-address go forward by causing the read-address to address-jump, and re-reads out the same audio data D1 to perform data interpolation in case of making the read-address go backward, which can make audio temporally coordinate with video that undergoes the variable-speed reproduction processing.

In this way, the control unit 4 of the audio input/output control apparatus 1 can bring about the above-described effect by only causing the read-address to address-jump. So, as compared with the case of performing the cross-fade processing requiring operations of many additions and multiplications, the amount of signal processing can be significantly reduced.

Furthermore, the control unit 4 of the audio input/output control apparatus 1 controls such that the initial delay of a constant range of approximately 1024 slots±100 slots is retained as the difference of the read-address and the write-address. Accordingly, the risk of overtaking the read-address by the write-address or overtaking the write-address by the read-address can be prevented in advance.

In the above-described configuration, when a video tape recorder operates the program play function, and audio is output in conformity to the variable-speed reproduction processing for video without changing the tone interval, the control unit 4 of the audio input/output control apparatus 1 can reduce the amount of signal processing to a larger extent as well as maintain the quality of the audio data D1.

(5) Other Embodiments

In the above-described embodiment, the case in which the ring buffer 10 having 2048 slots is used is explained. Alternatively, however, the present invention is not restricted to this, and a ring buffer having 4096 slots may be used in view of the quality of audio, or a ring buffer having 1024 slots may be used in view of the point of reducing the initial delay.

In the above-described embodiment, the offset detector 5 calculates the average value by dividing the total value of the signal level of the audio data D1 to be sequentially written to 2048 slots of the ring buffer 10 by 2048, and detects the average value as an offset amount of direct current component. Alternatively, however, the present invention is not restricted to this, and the intermediate value of the maximum value and the minimum value of the audio data D1 may be detected as an offset amount of direct current component.

In the above-described embodiment, the present invention is applied to the case in which the audio data D1 is written every slot under writing speed of 48 kHz±5%. Alternatively, however, the present invention is not restricted to this, and may be applied to the case in which writing speed for the audio data D1 to the ring buffer 10 is not fixed to 48 kHz±5% but variable.

In the above-described embodiment, when the program play function operates, input/output of the audio data D1 is controlled in conformity to the variable-speed reproduction processing for video. Alternatively, however, the present invention is not restricted to this, and input/output of the audio data D1 may be controlled independently of the variable-speed reproduction processing for video.

In the above-described embodiment, the audio input/output control apparatus 1 is installed to a video tape recorder. Alternatively, however, the present invention is not restricted to this, and the audio input/output control apparatus 1 may be installed to a video-editing apparatus, a voice recorder, an audio recording apparatus, a personal computer, a hard disk recorder, a cellular phone, and other various types of electronic devices.

In the above-described embodiment, the audio input/output control apparatus of the present invention is configured by the ring buffer 10 working as a memory, and the control unit 4 working as an address change unit as well as a read-address determination unit. Alternatively, however, the present invention is not restricted to this, and the audio input/output control apparatus may be configured by a memory, an address change unit, and a read-address determination unit of other configuration.

The audio input/output control apparatus and audio input/output control method of the present invention can be applied, for example, in the case of temporally expanding or temporally compressing audio data with the quality of the audio data highly maintained.

It should be understood by those skilled in the art that various modifications, combinations, sub-combinations and alterations may occur depending on design requirements and other factors insofar as they are within the scope of the appended claims or the equivalents thereof.

What is claimed is:

1. An audio input/output control apparatus, comprising:
    a memory for storing received audio data;
    writing speed detector unit for calculating a first difference value between the current read-address and the write-address;
    a judging unit for judging whether the first difference value is smaller than 256 slots, whether the first difference value is larger than 1024 slots, or whether the first difference value is in an inclusive range from 256 slots to 1024 slots;
    a read-address change means for forcibly changing a current read-address according to a speed difference between writing speed in writing the audio data to the memory and a reading speed in reading out the audio data stored in the memory under a constant speed; and
    read-address determination means for determining a second read address after the change,
    wherein, when the first difference value is in the range from 256 slots to 1024 slots, the second read address is set to a first forward zero cross address,
    wherein, when the first difference value is less than 256 slots, the second read-address is set to the second forward zero cross address,
    wherein a second difference value is calculated between the current read-address and the second read-address, wherein, when the second difference value is calculated to be more than 1024 slots, the read address change means does not change the read address, and wherein, when the second difference value is calculated to be less than 1024 slots, audio data is clipped and the read address change means forcibly changes the current read-address to the second read-address.

2. The audio input/output control apparatus according to claim 1, wherein the read-address determination means determines, between the signal level of the audio data corresponding to a read-address before the change and the signal level of the audio data corresponding to a read-address after the change, an address position located in the vicinity of a zero cross at which the signal level change is less than the predetermined value, as a read-address after the change.

3. The audio input/output control apparatus according to claim 1, further comprising:

writing speed detection means for detecting the writing speed.

4. The audio input/output control apparatus according to claim 1, wherein the read-address change means forcibly changes the read-address before the write-address or the read-address catches up to the read-address or the write-address due to the speed difference.

5. The audio input/output control apparatus according to claim 4, wherein the read-address change means does not change the read-address when the difference between the write-address and the read-address is larger than the predetermined value, and forcibly changes the read-address in case the difference is equal to the predetermined value or lower.

6. The audio input/output control apparatus according to claim 1, wherein when an unnecessary direct current component is overlapped on the audio data, the read-address determination means determines a read-address after the change with the direct current component removed.

7. An audio input/output control method, comprising: a writing speed detecting step for calculating a first difference value between the read-address and the write-address;

a judging step for judging whether the first difference value is smaller than 256 slots, whether the first difference value is larger than 1024 slots, or whether the first difference value is in a range from 256 slots to 1024 slots;

a speed difference calculation step of calculating the speed difference between writing speed in writing audio data sent from outside to a memory and reading speed in reading out the audio data stored in the memory under a constant speed;

a read-address change step of forcibly changing a current read-address according to the speed difference; and a read-address determination step of determining a second read address, wherein, when the first difference value is in the range from 256 slots to 1024 slots, the second read-address is set to a first forward zero cross address, wherein, when the first difference value is less than 256 slots, the second read address is set to the second forward zero cross address, wherein a second difference value is calculated between the current read-address and the second read-address, wherein, when the second difference value is calculated to be more than 1024 slots, the read address change means does not change the read address, and wherein, when the second difference value is calculated to be less than 1024 slots, audio data is clipped and the read address change means forcibly changes the current read-address to the second read-address.

8. The audio input/output control method according to claim 7, wherein in the read-address determination step, between the signal level of the audio data corresponding to a read-address before the change and the signal level of the audio data corresponding to a read-address after the change, an address position located in the vicinity of the zero cross at which the signal level change is less than the predetermined value is determined as a read-address after the change.

9. The audio input/output control method according to in claim 7, further comprising:

a writing speed detection step of detecting the writing speed.

10. The audio input/output control method according to claim 7, wherein in the read-address change step, the read-address is forcibly changed before the write-address or the read-address catches up to the read-address or the write-address due to the speed difference.

11. The audio input/output control method according to claim 10, wherein in the read-address change step, the read-address is not changed when the difference between the write-address and the read-address is larger than the predetermined value, and the read-address is forcibly changed in case the difference is equal to the predetermined value or lower.

12. The audio input/output control method according to claim 7, wherein when an unnecessary direct current component is overlapped on the audio data, in the read-address determination step, a read-address after the change is determined with the direct current component removed.

* * * * *